(12) United States Patent
Yuan et al.

(10) Patent No.: US 10,190,881 B2
(45) Date of Patent: Jan. 29, 2019

(54) METHOD AND APPARATUS FOR ENHANCED PEDESTRIAN NAVIGATION BASED ON WLAN AND MEMS SENSORS

(71) Applicant: UTI Limited Partnership, Calgary (CA)

(72) Inventors: Zhuang Yuan, Hollywood, FL (US); Naser El-Sheimy, Calgary (CA)

(73) Assignee: Profound Positioning Inc., Calgary (CA)

( * ) Notice: Subject to any disclaimer, the term of this patent is extended or adjusted under 35 U.S.C. 154(b) by 0 days.

(21) Appl. No.: 14/991,854

(22) Filed: Jan. 8, 2016

(65) Prior Publication Data
US 2017/0227363 A1   Aug. 10, 2017

Related U.S. Application Data

(60) Provisional application No. 62/101,359, filed on Jan. 8, 2015.

(51) Int. Cl.
| | |
|---|---|
| G01C 21/20 | (2006.01) |
| G01C 21/16 | (2006.01) |
| H04B 17/318 | (2015.01) |
| H04W 4/02 | (2018.01) |
| G01C 22/00 | (2006.01) |
| H04W 84/12 | (2009.01) |

(52) U.S. Cl.
CPC ......... *G01C 21/206* (2013.01); *G01C 21/165* (2013.01); *G01C 22/006* (2013.01); *H04B 17/318* (2015.01); *H04W 4/027* (2013.01); H04W 84/12 (2013.01)

(58) Field of Classification Search
None
See application file for complete search history.

(56) References Cited

U.S. PATENT DOCUMENTS

| | | | |
|---|---|---|---|
| 8,010,308 B1 * | 8/2011 | Churchill | G01C 25/005 |
| | | | 702/104 |
| 2007/0139269 A1 * | 6/2007 | Chen | G01S 5/0252 |
| | | | 342/450 |
| 2007/0260418 A1 * | 11/2007 | Ladetto | G01C 21/165 |
| | | | 702/150 |
| 2010/0246416 A1 * | 9/2010 | Sinha | H04W 24/06 |
| | | | 370/250 |
| 2011/0313716 A1 * | 12/2011 | Smid | G01C 21/165 |
| | | | 702/141 |

(Continued)

Primary Examiner — Jean Paul Cass
(74) Attorney, Agent, or Firm — Gordon IP Law, PLLC

(57) ABSTRACT

Methods, systems and apparatuses for enhanced Microelectromechanical (MEMS)-based navigation in a mobile device are disclosed. In an embodiment, a method includes receiving navigation data from one or more navigation sensors on board the mobile device. The method may also include calculating, using a processing device, position, velocity, and attitude (PVA) values in response to the navigation data using an Inertial Navigation System (INS) mechanization. Additionally, the method may include calculating, using the processing device, Pedestrian Dead Reckoning (PDR) values in response to the navigation data. Also, the method may include determining, using the processing device, one or more navigation values in response to a combination of the PVA values calculated by the INS mechanization and the PDR values.

18 Claims, 27 Drawing Sheets

(56) References Cited

U.S. PATENT DOCUMENTS

| | | | |
|---|---|---|---|
| 2012/0136573 A1* | 5/2012 | Janardhanan | G01C 21/165 701/512 |
| 2013/0090881 A1* | 4/2013 | Janardhanan | G01C 22/006 702/104 |
| 2013/0267260 A1* | 10/2013 | Chao | G01C 21/206 455/457 |
| 2013/0332064 A1* | 12/2013 | Funk | G01C 21/206 701/409 |
| 2014/0316305 A1* | 10/2014 | Venkatraman | A61B 5/1112 600/595 |
| 2015/0241245 A1* | 8/2015 | Hsu | G01C 25/005 73/1.77 |
| 2015/0247729 A1* | 9/2015 | Meduna | H04W 4/027 702/150 |
| 2015/0346332 A1* | 12/2015 | Taylor, Jr. | G01S 13/84 342/458 |
| 2015/0346349 A1* | 12/2015 | Taylor, Jr. | G01S 11/08 342/357.24 |
| 2015/0351067 A1* | 12/2015 | Taylor, Jr. | G01S 11/08 455/456.1 |
| 2016/0007158 A1* | 1/2016 | Venkatraman | H04W 4/023 455/456.2 |
| 2016/0169703 A1* | 6/2016 | Omr | G01C 22/006 702/160 |
| 2016/0223340 A1* | 8/2016 | Shin | G01C 21/206 |
| 2016/0231109 A1* | 8/2016 | Chang | G01P 13/00 |
| 2016/0252354 A1* | 9/2016 | Georgy | G01C 21/165 701/500 |
| 2017/0023604 A1* | 1/2017 | Kourogi | G01C 21/16 |
| 2017/0059327 A1* | 3/2017 | Miller | G01C 21/165 |
| 2017/0059601 A1* | 3/2017 | Miller | G01C 21/165 |
| 2017/0059602 A1* | 3/2017 | Miller | G01C 21/165 |
| 2017/0188893 A1* | 7/2017 | Venkatraman | A61B 5/1112 |

* cited by examiner

METHOD AND APPARATUS FOR ENHANCED PEDESTRIAN NAVIGATION BASED ON WLAN AND MEMS SENSORS

CROSS-REFERENCE TO RELATED APPLICATIONS

This application claims the benefit and priority of U.S. Provisional Pat. App. No. 62/101,359 entitled "METHOD AND APPARATUS FOR ENHANCED PEDESTRIAN NAVIGATION BASED ON WLAN AND MEMS SENSORS" filed on Jan. 8, 2015, which is incorporated herein in its entirety.

TECHNICAL FIELD

The present disclosure relates to navigation systems and methods, especially navigation systems and methods for pedestrians.

BACKGROUND

In the past several years, the demand for devices such as smartphones has grown exponentially. Multi-applications, such as calling, texting, gaming and internet browsing, make smartphones essential tools for people's everyday life. Technological advancements have facilitated the manufacturing of compact, inexpensive, and low-power consuming receivers as well as sensors for smartphones (devices), therefore, enabling the development of smartphone-based pedestrian navigation applications. Smartphones create limitless possibilities for navigation and positioning applications due to their sophisticated microprocessors, powerful operating systems, embedded sensors, and portable characteristics.

GPS (Global Positioning System), which is usually embedded in smartphones, provides an accurate position solution outdoors. However, the degradations and interruptions of GPS signals mean that GPS cannot be used to achieve accurate and continuous navigation solutions in challenging areas such as urban canyons, tunnels and indoors. On the other hand, the demand for navigation in these challenging areas is quickly increasing in various applications including: health care monitoring, logistics, Location Based Services (LBS), emergency services, tourism, and people management. The pedestrian navigation has been a popular research topic in the last decade.

As an alternative to GPS, self-contained navigation systems based on MEMS sensors can be applied to different applications, including mobile robot navigation and pedestrian navigation. Currently, there are two typical mechanizations for MEMS sensors to compute the navigation solution: INS (inertial navigation system) mechanization and PDR (pedestrian dead reckoning). The INS mechanization calculates the position, velocity, and attitude (PVA) of the object by integrating raw data from the accelerometers and gyroscopes. This mechanization can provide 3D PVA information, however, navigation errors by using this algorithm increase rapidly with time due to the drift characteristics of MEMS sensors.

To improve the MEMS navigation performance for pedestrians, PDR may reduce the accumulated speed of navigation errors. PDR has four critical procedures: step detection, step/stride length estimation, heading estimation, and 2D position calculation. The PDR provides a more accurate position solution than the INS mechanization, without other aiding sources, because it uses fewer integration calculations. The typical PDR algorithm usually assumes that the device is level (roll and pitch are zero degrees). Unfortunately, the roll and pitch cannot be ignored sometimes. In this case, PDR-based heading, calculated by the direct integration of the data from the vertical gyroscope, is inaccurate. The heading estimation error will finally affect the positioning accuracy. Furthermore, the PDR navigation solution still drifts with time. Therefore, both INS mechanization and PDR require additional aiding sources, such as GNSS, WLAN (Wireless Local Area Network, such as IEEE 802.11), and magnetometers, to reduce the navigation errors.

Many other approaches have been defined for pedestrian navigation, based on various types of hardware, including WLAN, ultra wideband (UWB), FM, and radio frequency identification (RFID), etc. However, pedestrian navigation in the challenging areas still unsolved due to several practical issues, such as special hardware designs and complicated infrastructure requirements. Most approaches, such as UWB and RFID, require special hardware or infrastructures to achieve accurate pedestrian navigation, which makes these approaches impractical. WLAN positioning does not require special hardware and is only based on WLAN infrastructures (routers), which have already have well-established in most public buildings such as universities, colleges, airports, shopping malls, and office buildings, making WLAN as the main aiding resource for MEMS sensors in challenging areas, such as indoors.

Fingerprinting and trilateration are two main approaches for WLAN positioning. Fingerprinting-based WLAN positioning usually has two operating phases: the pre-survey phase and the online positioning phase. In the pre-survey phase, Received Signal Strength (RSS) values from available access points (APs) and position information are collected as fingerprints for creating the radio map database. In the online positioning phase, the object's position is estimated by comparing observed RSS values with the fingerprints in the pre-built database. Trilateration-based WLAN positioning first calculates the ranges between the object and APs (routers) through the wireless signal propagation model. Then, the object's position is estimated by the use of trilateration. Fingerprinting usually provides more accurate position solutions at the cost of survey work in the pre-survey phase. These RSS based WLAN positioning methods usually have the following limitations: 1) they cannot provide complete navigation information (3D PVA); and 2) RSS values may have some blunders, which are affected by the environments, such as the multipath effect.

As such, there is a need for a method and apparatus for pedestrian applications to provide an enhanced navigation solution capable of accurately utilizing MEMS sensors' measurements from a device to determine the navigation state of the device/pedestrian while decreasing the effect of the above mentioned problems whether in the presence or in the absence of WLAN routers.

BRIEF SUMMARY OF THE INVENTION

The present disclosure relates to a method and apparatus for providing an enhanced navigation solution for pedestrian applications. The navigation solution is for one device and a pedestrian. The device can be handheld or located on a body of a pedestrian. The device includes a sensor assembly and WLAN. The sensors in the device use the MEMS technology and may be for example, accelerometers, gyroscopes, magnetometers, barometer amongst others. The sensors have a corresponding frame for the sensors' axes. The present method and apparatus can be used whether in the presence or in the absence of WLAN routers.

Methods, systems and apparatuses for enhanced Microelectromechanical (MEMS)-based navigation in a mobile device are disclosed. In an embodiment, a method includes receiving navigation data from one or more navigation sensors on board the mobile device. The method may also include calculating, using a processing device, position, velocity, and attitude (PVA) values in response to the navigation data using an Inertial Navigation System (INS) mechanization. Additionally, the method may include calculating, using the processing device, Pedestrian Dead Reckoning (PDR) values in response to the navigation data. Also, the method may include determining, using the processing device, one or more navigation values in response to a combination of the PVA values calculated by the INS mechanization and the PDR values.

BRIEF DESCRIPTION OF THE DRAWS

DETAILED DESCRIPTION OF THE INVENTION

Figure 1:
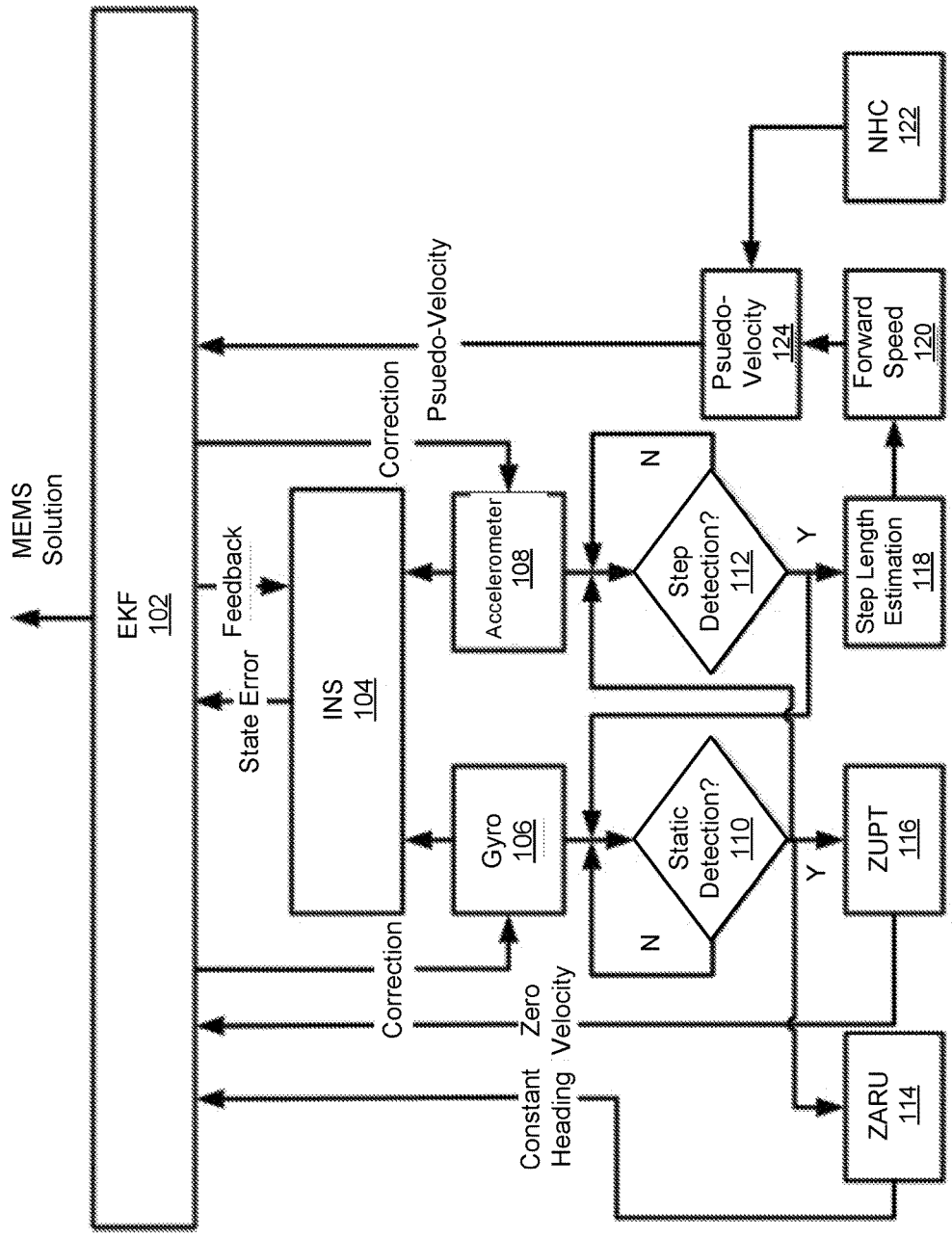
FIG. 1 shows the block diagram of the present MEMS sensors based navigation solution.

A pedestrian navigation is disclosed based on the integration of low-cost MEMS sensors and WLAN, which uses three approaches to enhance the navigation performance: 1) The use of the MEMS solution based on the integration of PDR and INS mechanization; 2) The use of motion constraints for the MEMS solution, such as NHC (Non-holonomic constraints), ZUPT (Zero velocity updates), and ZARU (Zero Angular Rate Updates); and 3) The use of LC/TC integrations for MEMS sensors and WLAN.

The first approach improves the MEMS-based pedestrian navigation solution through the integration of PDR and INS mechanization. The present MEMS solution combines the advantages of both schemes. In this algorithm, step detection and step length estimation are kept the same as the traditional PDR algorithm. The estimated step length is used to calculate the forward speed, which works as the velocity update for the INS mechanization to limit the velocity error, and further limit the position error and attitude error. Therefore, the present MEMS solution is superior to the typical INS solution. The heading from the present MEMS solution also performs better when compared with PDR because it considers the effect of the roll and pitch.

The second improvement is due to the use of motion constraints, such as NHC, ZUPT, and ZARU for the MEMS sensors based navigation solution. NHC considers the fact that a land vehicle cannot move sideways or vertically to work as the velocity update to improve the MEMS solution. NHC is also suitable for normal pedestrian walking. ZUPT uses zero velocity as the velocity update to limit velocity error if the pedestrian is static. ZARU considers the fact that the heading remains unchanging to limit the attitude error if the pedestrian is static. With these motion constraints, the pedestrian navigation can achieve a better navigation performance.

The third approach improves the performance of the pedestrian navigation through the use of LC and TC integrations of WLAN and MEMS sensors. In the LC integration, WLAN positions are used as the updates for the MEMS sensors. WLAN positions are mainly calculated through fingerprinting and trilateration. In the first case, LSQ is usually used to adjust an optimal solution for the trilateration. Besides the WLAN positioning solutions, approximate positioning accuracies are also derived from the position covariance matrix in the LSQ, which works as an indicator to determine whether WLAN position is accurate enough for the LC integration. In the second case, fingerprinting usually provides a more accurate position solution, but at the cost of extensive work in the pre-survey phase. Both trilateration-based and fingerprinting-based WLAN solutions can be used for LC integration. However, the LC integration has one main drawback that is no WLAN positions are provided as updates for MEMS sensors if the observed APs are less than 3. This drawback limits the navigation performance of LC integration, especially in an environment with sparsely deployed APs. A TC integration may overcome this limit, and improve the navigation performance. Different from the LC integration, which is based on the MEMS sensors based navigation solution and WLAN positioning solution, the present TC integration integrates the raw data of MEMS sensors with WLAN-RSS-based distances/ranges. 15 states for MEMS (3D position error, 3D velocity error, 3D attitude error, gyroscope drift, and accelerometer bias) and 1 state (RSS bias) for WLAN are used as the state vector in the Extended Kalman Filter (EKF) for the TC integration. The main benefit of this method is that the drift of MEMS sensors can be reduced by WLAN, even if only one or two APs are available. The introduction of the WLAN RSS bias in the TC integration also improves the navigation performance of the present system.

Several field tests are carried out to demonstrate the performance of the present methods and systems. The navigation performances of PDR, INS, the present MEMS solution, the LC integration solution, and the TC integration solution are also compared.

MEMS Sensors Based Pedestrian Navigation Solution

The block diagram of an embodiment of a MEMS solution for pedestrian navigation is shown in FIG. 1. In this MEMS solution, data from gyroscopes 106 and accelerometers 108 first pass to the INS mechanization 104, which may include the EKF 102. The accelerometer 108 and gyroscope 106 data are also used for step detection 112 and static detection 110, respectively. If the step detection 112 is successful and the static detection 110 fails, the PDR step length is estimated in the module of "step length estimation" 118, and is further used to derive the forward speed 120. NHC 122 is also used to constrain the lateral and vertical speeds of the moving platform. The PDR-based forward speed and the NHC-based lateral and vertical speeds are combined to 3-axis pseudo-velocity 124 to work as the velocity update for the INS mechanization 104 to limit the velocity error. If the step detection 112 fails and static detection 110 is successful, ZUPT 116 and ZARU 114 apply zero velocity and unchanging heading as the velocity and heading updates for the INS mechanization 104 to reduce navigation errors. The disclosed MEMS sensors based navigation solution is better than traditional INS and PDR algorithms as described in further detail below.

As per the previous discussion, INS mechanization and PDR are two main approaches for MEMS sensors based pedestrian navigation. The INS mechanization based navigation system provides a complete PVA solution. However, navigation error rapidly increases with time due to the drift characteristics of MEMS and the integrations used in the INS mechanization. PDR provides a more accurate navigation solution than INS mechanization because it calculates the step length through the practical model, which avoids using integrations. However, PDR derives the heading information from the direct integration of the vertical gyroscope, which is inaccurate if the roll and pitch effects cannot be ignored. An innovative MEMS sensors based navigation solution is disclosed, based on the integration of INS mechanization and PDR as well as motion constraints. In this disclosed navigation solution, INS mechanization is first used to process the data of MEMS sensors. Then, the accelerometers and gyroscopes are used to detect the status of the pedestrian (moving or static). If the detection result is "moving", PDR-based forward speed and NHC-based lateral and vertical speeds are combined to form the pseudo-velocity, which works as the velocity update for the INS mechanization to limit velocity error. If the detection result is "static", ZUPT and ZARU are used as updates for the INS mechanization to improve the navigation solution.

Angular rates and accelerations from the gyroscopes and accelerometers are used to detect the status of the pedestrian: moving or static. The status of the pedestrian is determined as "moving", if the following two conditions are satisfied: 1) the standard deviation of the angular rate norms during a certain time is larger than the threshold; and 2) steps are detected. On the other hand, the status of the pedestrian is determined as "static", if the following two conditions are satisfied: 1) the standard deviation of the angular rate norms during a certain time is less than the threshold; and 2) no steps are detected.

For the "moving" case, the step length is estimated using a practical model, which assumes the step length is proportional to the vertical movement of the human hip. The largest difference of the vertical acceleration at each step is used to calculate vertical movement. The equation for step length estimation is expressed as:

$$SL = \sqrt[4]{a_{zmax} - a_{zmin}} \cdot K \tag{1}$$

where $a_{z\ max}$ is the maximum value of the vertical acceleration $a_z$, $a_{z\ min}$ is the minimum value of $a_z$, and K is a calibrated constant parameter. To use the step length to provide information about the forward speed, it may be assumed that a pedestrian's moving speed is constant for a short time. This assumption is approximately correct for most moving cases of pedestrians. The forward speed can be derived from the step length as expressed in $$v_{forward} = SL/T_{step} \tag{2}$$

where SL represents the step length, and $T_{step}$ represents the step time. NHC is also used to constrain the lateral and vertical speeds of the pedestrian. Combining the NHC and PDR-based forward speed, the pseudo-velocity vector in the body frame is given by $$v_{pseudo}^{b}=[SL/T_{step}\ 0\ 0]^{T} \quad (3)$$

The pseudo-velocity-vector is used for the velocity update to improve the MEMS sensors based navigation performance. The misclosure of the velocity in the body frame is given by $$\delta z = v_{INS}^{b} - v_{pseudo}^{b} \quad (4)$$

where $v_{INS}^{b}=(C_{b}^{n})^{T} \cdot v_{INS}^{n}$ represents the INS mechanization derived velocity in the body frame; $C_{b}^{n}$ represents the transformation matrix; and $v_{INS}^{n}$ represents the INS mechanization derived velocity in the navigation frame. Finally, the observation model for the pseudo-velocity-vector update is expressed in $$\delta v^{b} = H_{v^{b}} \delta x + v_{v^{b}} \quad (5)$$

where $v_{v^{b}}$ represents the measurement noise. $H_{v^{b}}$ represents the corresponding design matrix:

$$H_{v^{b}} = [0_{3\times3} (C_{b}^{n})^{T} - (C_{b}^{n})^{T} V^{n} 0_{3\times 6}] \quad (6)$$

where $V^{n}$ is the skew-symmetric matrix of $v^{n}$.

If "static" is detected, ZUPT and ZARU are used as the updates to limit the navigation error. The ZUPT-based zero velocity vector in the body frame is given by $$v_{ZUPT}^{b} = [0\ 0\ 0]^{T} \quad (7)$$

Similar to the pseudo-velocity vector, the ZUPT-based zero velocity vector is used as the velocity update. If the pedestrian is detected as "static", the pedestrian heading is unchanging based on ZARU. Therefore, the misclosure for the heading update is given by $$\delta z = \psi_{INS} - \psi_{pre\text{-}stored} \quad (8)$$

where $\psi_{INS}$ is the INS mechanization derived heading; and $\psi_{pre\text{-}stored}$ is the pre-stored heading of the last epoch before the "static" is detected. Finally, the observation model for the heading update is expressed in $$\delta \psi = H_{\psi} \delta x + v_{\psi} \quad (9)$$

where $v_{\psi}$ represents the measurement noise; and $H_{\psi}$ represents the corresponding design matrix:

$$H_{\psi}=[0_{1\times6}\ \partial\psi/\partial\varepsilon_{N}\ \partial\psi/\partial\varepsilon_{E}\ \partial\psi/\partial\varepsilon_{D}\ 0_{1\times 7}] \quad (10)$$

LC Integration of MEMS Sensors and WLAN

Figure 2:
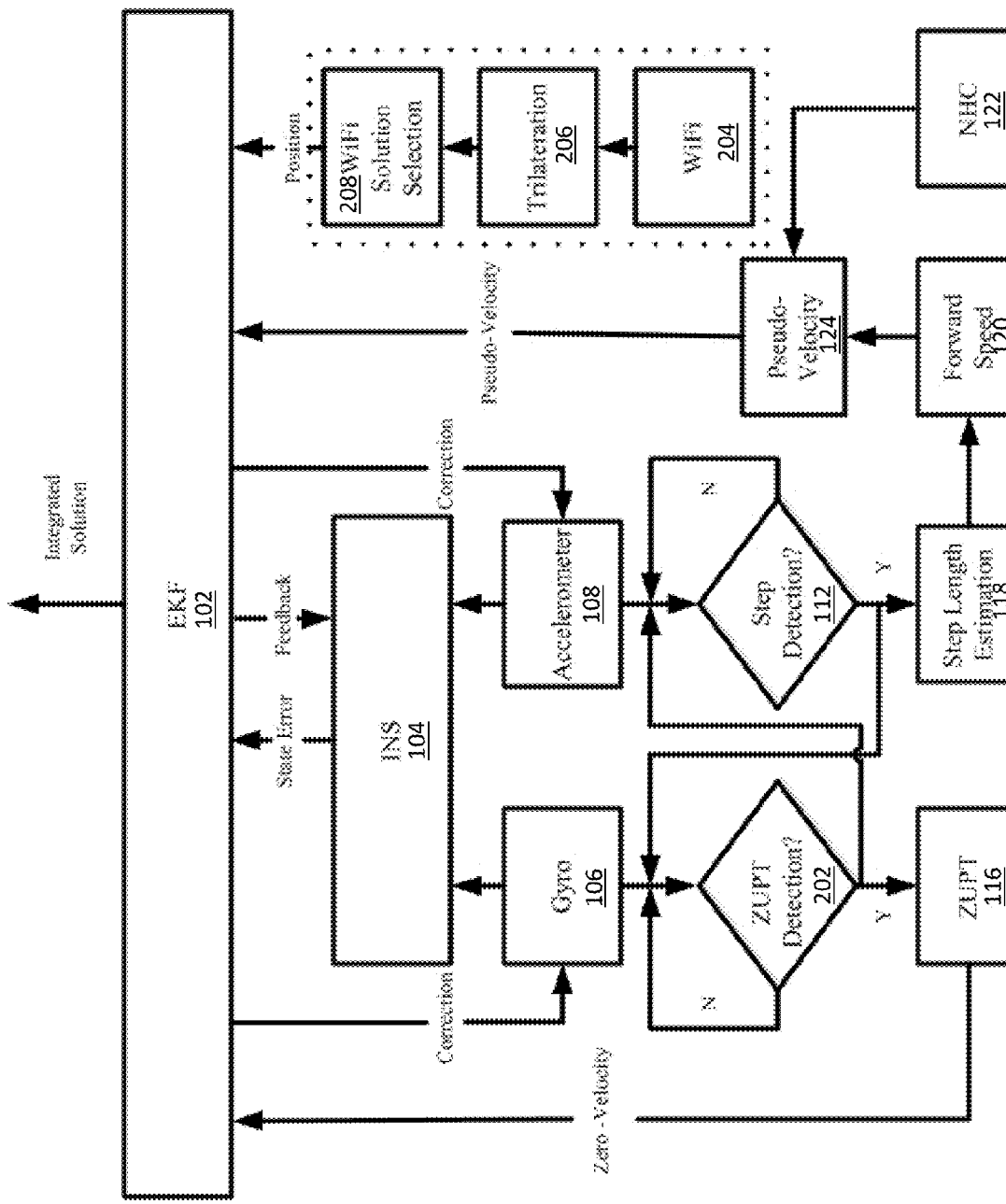
FIG. 2 shows the block diagram of the LC (loosely-coupled) integration of MEMS sensors based navigation solution and trilateration-based WLAN positioning solutions.

The block diagram of the disclosed LC integration of MEMS sensors based navigation solution and trilateration-based WLAN positioning solution is shown in FIG. 2. The modules outside the dashed box may be the previously disclosed MEMS sensors based navigation solution, similar to that of FIG. 1. The modules inside the dashed box is the WLAN (Wireless Local Area Network) solution for LC integration. In an embodiment, the solution of FIG. 2 may be used for the trilateration-based WLAN positioning and LC integration of WLAN and MEMS sensors. In this case, trilateration 206 of WiFi 204 signals is used to estimate WLAN positions and their standard deviations. In LC integration, WLAN positions, with standard deviations less than a pre-set threshold, are selected 208 as the updates for MEMS sensors. In some embodiments, the ZARU 114 steps can be omitted by first checking for ZUPT detection as shown at block 202.

The trilateration-based WLAN positioning solution can be noisy due to the complex characteristics of some environments. Therefore, when using the LC integration, it is significant to use an approach to select good WLAN positions. It is fortunate that the standard deviations of WLAN positions are estimated in the state covariance matrix of the LSQ. Although these standard deviations are not perfectly estimated, they still can be used as a rough indicator for selecting the WLAN positions for LC integration. In this disclosure, WLAN positions with standard deviations less than a pre-set values are chosen as the updates for the MEMS sensors. The misclosure of the WLAN-based position measurements is given by $$\delta z_{WiFi} = \left( \begin{bmatrix} \hat{\lambda} \\ \hat{\varphi} \\ \hat{h} \end{bmatrix}_{MEMS} - \begin{bmatrix} \lambda \\ \varphi \\ h \end{bmatrix}_{WiFi} \right) \begin{bmatrix} (N+h)\cos\varphi \\ M+h \\ 1 \end{bmatrix}^{T} \quad (11)$$

where $\hat{\lambda}$, $\hat{\varphi}$ and $\hat{h}$ are MEMS-estimated latitude, longitude and altitude; $\lambda$, $\omega$ and $h$ are WLAN-based latitude, longitude and altitude. M is the meridian radius of the earth's curvature; and N is the prime vertical radius of the earth's curvature. The observation equation for the WLAN position measurements is formulated as $$\delta z_{WiFi} = H_{WiFi} \delta x + v_{WiFi} \quad (12)$$

where $v_{WiFi}$ represents the measurement noise of the WLAN positions; and $H_{WiFi}$ represents the corresponding design matrix which can be expressed as $$H_{WiFi} = [I_{3\times3}\ 0_{3\times 12}] \quad (13)$$

The covariance matrix, $R_{WiFi}$, for the WLAN-based position measurements is given by $$R_{WiFi} = \text{diag}([\sigma_{lat}^{2}\ \sigma_{lon}^{2}\ \sigma_{alt}^{2}]) \quad (14)$$

where $\sigma_{lat}^{2}$, $\sigma_{lon}^{2}$, and $\sigma_{alt}^{2}$ represent the variances of $[\lambda\ \varphi\ h]_{WiFi}^{T}$ in meters.

Figure 3:
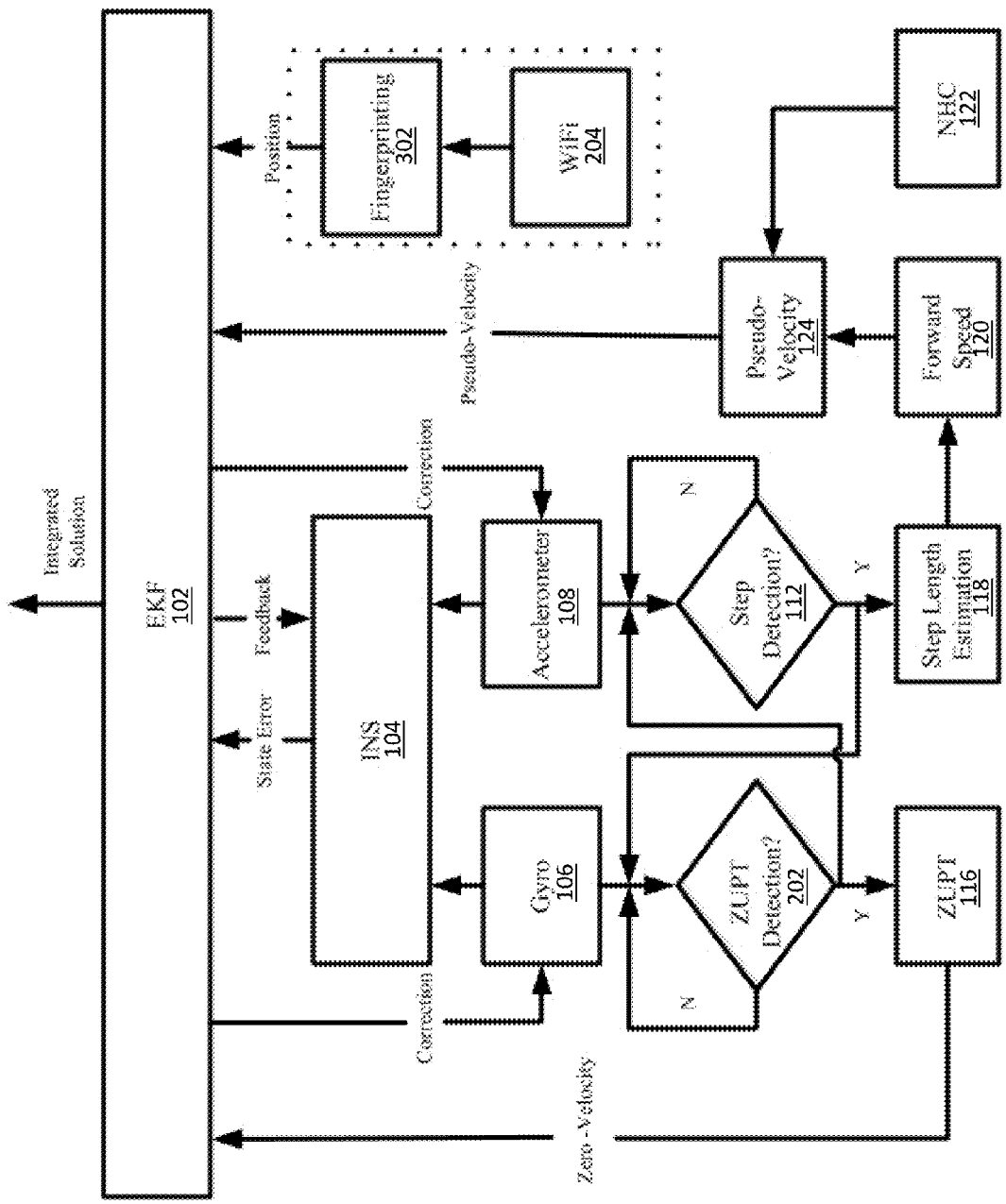
FIG. 3 shows the block diagram of the LC integration of MEMS sensors based navigation solution and fingerprinting-based WLAN positioning solutions.

The block diagram of the LC integration of MEMS sensors based navigation solution and fingerprinting-based WLAN positioning solutions is shown in FIG. 3. In this case, fingerprinting 302 is used to estimate WLAN positions from WiFi signals 204. Similar to trilateration-based solutions, in this LC integration, fingerprinting-based WLAN positioning solutions are used as the updates for MEMS sensors. Equations used for the LC integration of MEMS sensors based navigation solution and trilateration-based WLAN positioning solutions also can be used here for the LC integration of MEMS sensors based navigation solution and fingerprinting-based WLAN positioning solutions.

TC Integration of MEMS Sensors and WLAN

Figure 4:
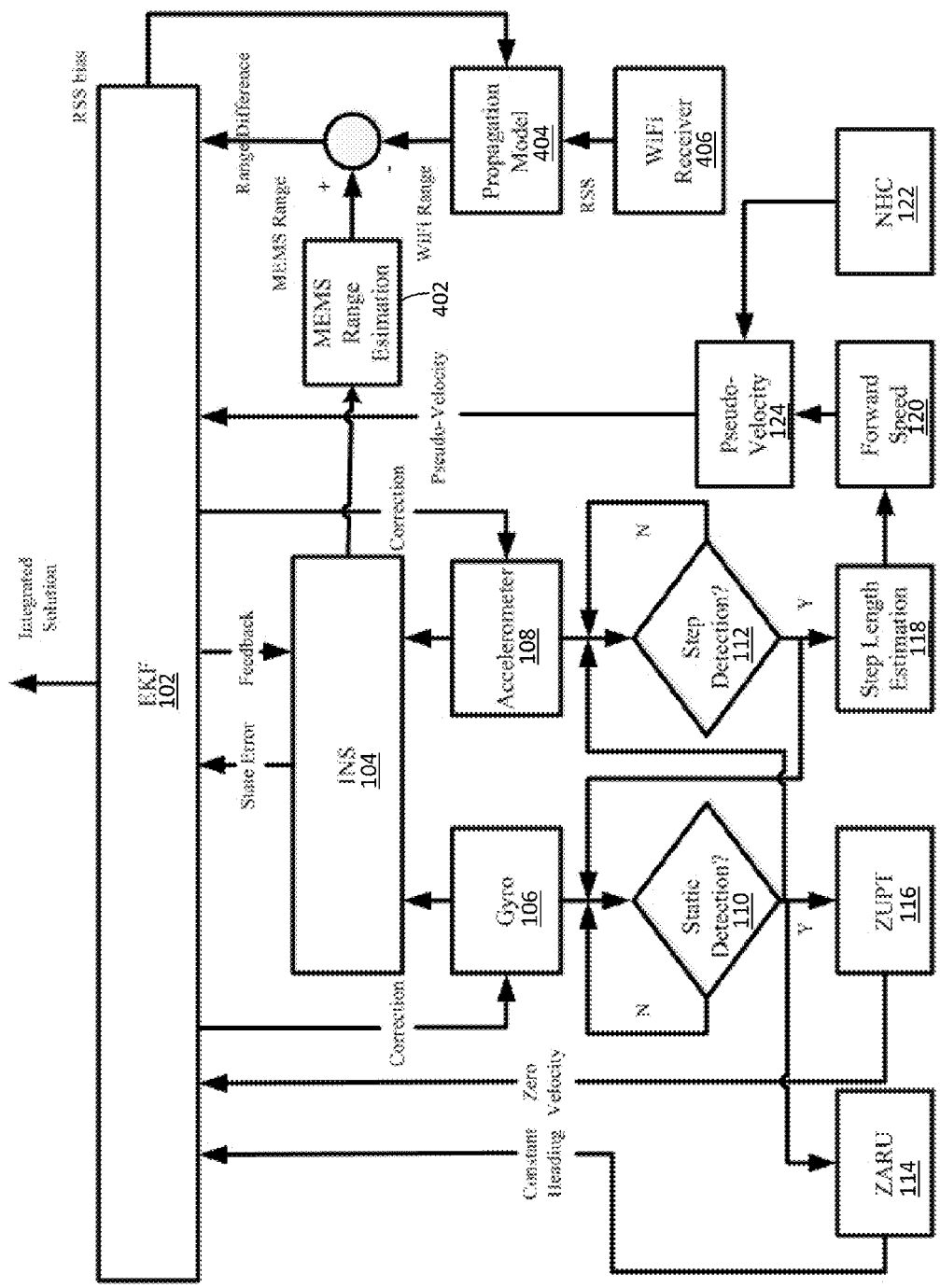
FIG. 4 shows the block diagram of the TC (tightly-coupled) integration of MEMS sensors and WLAN.

The block diagram of the disclosed TC WLAN/MEMS integration for the pedestrian navigation is shown in FIG. 4. This embodiment of the system is made up of three parts: (1) MEMS sensors based range estimation, (2) WLAN based range estimation, and (3) EKF-based TC integration. In the TC integration, the previously described embodiments of MEMS sensor-based navigation solution is used to generate the MEMS sensor based range information 402. In WLAN based range estimation, RSS values from the WiFi Receiver 406 pass to the propagation model 404 to generate the range. In the part of EKF-based TC integration, the range differences between MEMS sensors based ranges and WLAN based ranges pass to the EKF to estimate the state vector errors. The estimated state vector errors (3D position, velocity, and attitude error; accelerometer bias, gyroscope drift; and WLAN RSS bias) are fed back to the INS machination 102, 104 and to the WLAN range estimation 404. After the feedback, INS mechanization 102, 104 outputs the final integrated navigation solution for pedestrians.

In the following sections, the TC integration of MEMS sensors and WLAN is described in detail, including "MEMS sensors based ranges", "WLAN based ranges", "system model of TC integration" and "observation model of TC integration". In this research, WLAN based ranges are calculated based on the WLAN propagation model. The main advantage of TC integration is that WLAN based ranges can be used to aid MEMS sensors in cases where less than three WLAN APs are observed, whereas LC integration cannot estimate the WLAN positions based on trilateration to aid the MEMS sensors. Fingerprinting can provide a WLAN solution even if less than three APs are observed. However, the survey and maintenance of the fingerprint database make the system impractical. The present TC integration of WLAN and MEMS sensors has better performance than the LC integration, especially in an environment with a sparse deployment of WLAN APs (routers).

MEMS Sensors Based Ranges

TC WLAN/MEMS integration involves the use of new measurement data, namely the MEMS sensors based ranges, given by $$d_{MEMS,k} = \sqrt{[(\lambda_{MEMS} - \lambda_{AP,k})(N+h)\cos\varphi_{MEMS}]^2 + [(\varphi_{MEMS} - \varphi_{AP,k})(M+h)]^2 + (h_{MEMS} - h_{AP,k})^2} \quad (15)$$

where $\lambda_{MEMS}$, $\varphi_{MEMS}$, and $h_{MEMS}$ represent MEMS position coordinates (longitude, latitude, and altitude); $\lambda_{AP,k}$, $\varphi_{AP,k}$, and $h_{AP,k}$ represent position coordinates of $k^{th}$ WLAN AP (longitude, latitude, and altitude); M represents the meridian radius of the earth curvature; and N represents the prime vertical radius of the earth curvature.

WLAN Based Ranges

The typical propagation model is given as follows:

$$RSS = A - 10 \cdot n \cdot \log_{10}(d) + X_\sigma \quad (16)$$

where RSS represents the received signal strength in dBm at a distance, d, from the transmitter. A represents a constant which depends on several factors: averaged fast and slow fading, transmitter gain, receiver gain and transmitted power. Therefore, in practice, its value is usually known beforehand. n represents the path loss exponent with typical values, 2-6, in indoors. $X_\sigma$ represents the shadow noise modeled as a Gaussian random variable with zero mean and standard deviation, $\sigma_{RSS}$. The range between the receiver and the transmitter can be estimated by the maximum likelihood estimator (MLE), and the result is given by:

$$\hat{d}_{RSS} = 10^{(A-RSS)/10 \cdot n} \quad (17)$$

The experimental standard deviation of RSS values, $\sigma_{RSS}$ is almost independent of d. By differentiating the propagation model in (16) with respect to d, obtaining $$\frac{\partial RSS}{\partial d} = -\frac{10 \cdot n}{\ln(10) \cdot d} \quad (18)$$

Therefore, the standard deviation of the range d is given by $$\sigma_d = \ln(10) \cdot d \cdot \sigma_{RSS}/10 \cdot n \quad (19)$$

$\sigma_d$ is linearly proportional to d, which illustrates the fact that the uncertainty of the range estimation grows with the range d. Note that there are other propagation models that consider the effects of walls and floors. However, they are not suitable for a real-time navigation system because a priori information of walls and floors are usually unavailable.

RSS measurements usually contain a bias for several reasons such as the inaccurate pre-set value of the constant A in (16). Therefore, the estimated range, $\hat{d}_{RSS}$, is not equal to the geometric range, d, between the transmitter and the receiver. The RSS bias, $b_{RSS}$, is considered to compensate the difference between $\hat{d}_{RSS}$ and d. Therefore, the geometric range is given by $$d = 10^{A-RSS-b_{RSS}/10 \cdot n} = 10^{A-RSS/10 \cdot n} \cdot 10^{-b_{RSS}/10 \cdot n} = \hat{d}_{RSS} \cdot 10^{-b_{RSS}/10 \cdot n} \quad (20)$$

By reorganizing (20), (21) may be obtained $$\hat{d}_{RSS} = d \cdot 10^{b_{RSS}/10 \cdot n} = d \cdot f(b_{RSS}) \quad (21)$$

where f $(b_{RSS}) = 10^{b_{RSS}/10 \cdot n}$. It may be assumed that the absolute value of the RSS bias is less than 4 dBm. Due to $2 \leq n \leq 6$ and $abs(b_{RSS}) \leq 4$ dbm, $10^{b_{RSS}/10 \cdot n}$ is close to zero. Therefore, f $(b_{RSS})$ is linearized at the point of $b_{RSS} = 0$ by using the Taylor expansion, and the result is given by $$f(b_{RSS}) = f(0) + \left.\frac{\partial f(b_{RSS})}{\partial b_{RSS}}\right|_{b_{RSS}=0} \cdot b_{RSS} + \ldots \quad (22)$$

$$\approx 1 + \left.\left(\frac{\ln 10}{10 \cdot n} \cdot 10^{\frac{b_{RSS}}{10 \cdot n}}\right)\right|_{b_{RSS}=0} \cdot b_{RSS}$$

$$= 1 + \frac{\ln 10 \cdot b_{RSS}}{10 \cdot n}$$

Substitute (22) into (21), to obtain the relationship between $\hat{d}_{RSS}$ and d:

$$\hat{d}_{RSS} = d + (\ln 10 \cdot d/10 \cdot n) b_{RSS} \quad (23)$$

In the TC integration of WLAN and MEMS sensors, the RSS bias $b_{RSS}$ is also put in the state vector, and estimated through the EKF. Therefore, the system can also improve the estimation of WLAN based ranges by using the feedback of the estimated RSS bias, further improving the navigation performance.

System Model of TC Integration

In TC integration of MEMS sensors and WLAN, error states in the EKF consist of two parts. The first part is the sensor error states. Its system dynamic equation is given as $$\delta\dot{x}_s = F_s \delta x_s + G_s w_s \quad (24)$$

where the sensor error state vector, $\delta x_s$, contains 15 states (3D position, velocity, and attitude error; accelerometer bias as well as gyroscope drift). $w_s = [w_1 \ldots w_{15}]^T$, in which the elements comply with the assumptions of zero-mean and Gaussian distributed white noise and are uncorrelated with each other. Thus, the corresponding . . . is a unit matrix with a rank of 15.

The second part of the error states is the WLAN error state. In this invention, WLAN RSS bias is used to compensate the error in the propagation model to estimate a more accurate range. WLAN RSS bias is modeled as a random walk process. The differential equation can be written as follows:

$$\dot{b}_{RSS} = w_{b_{RSS}} \quad (25)$$

where $w_{b_{RSS}}$ is the white noise. The WLAN system dynamic model is given by $$\delta\dot{x}_W = F_W \delta x_W + G_W w_W \quad (26)$$

where $\delta x_W = b_{RSS}$, $F_W = 0$, $G_W = 1$, and $w_W = w_{b_{RSS}}$.

By combining (24) and (26), the following system model for the TC integration of WLAN and MEMS sensors is obtained.

$$\begin{bmatrix} \delta\dot{x}_s \\ \delta\dot{x}_W \end{bmatrix} = \begin{bmatrix} F_s & 0 \\ 0 & F_W \end{bmatrix} \begin{bmatrix} \delta x_s \\ \delta x_W \end{bmatrix} + \begin{bmatrix} G_s & 0 \\ 0 & G_W \end{bmatrix} \begin{bmatrix} w_s \\ w_W \end{bmatrix} \quad (27)$$

i.e. $\delta\dot{x} = F\delta x + Gw$

Observation Model of TC Integration

The range differences between the WLAN based ranges and the MEMS sensors based ranges are used as the observation vector, $\delta z$, in the TC EKF. By assuming there are m APs in-view, the measurements can be written as $$\delta z = \begin{bmatrix} \delta z_{1,range} \\ \vdots \\ \delta z_{m,range} \end{bmatrix} = \begin{bmatrix} d_{MEMS,1} - d_{WiFi,1} \\ \vdots \\ d_{MEMS,m} - d_{WiFi,m} \end{bmatrix} \quad (28)$$

where $d_{MEMS,k}$ is the MEMS sensors estimated range based on (15), and $d_{WiFi,k}$ is the $k^{th}$ AP's WLAN-based range measurement. Through (23), the WLAN based range of the $k^{th}$ AP is given by $$d_{WiFi,k} = d_k + (\ln 10 \cdot d_k / 10 \cdot n) b_{RSS} + v_{d_k} \quad (29)$$

where $v_{d_k}$ is the white noise of $d_{WiFi,k} \cdot d_k$ represents the geometric range between the pedestrian and the $k^{th}$ WLAN AP, which is expressed as $$d_k = \sqrt{\begin{array}{l}[(\lambda - \lambda_{AP,k})(N+h)\cos\varphi]^2 + \\ [(\varphi - \varphi_{AP,k})(M+h)]^2 + (h - h_{AP,k})^2\end{array}} \quad (30)$$

where $\lambda$, $\varphi$ and h represent the filtered pedestrian's coordinates (longitude, latitude, and altitude); $\lambda_{AP,k}$, $\varphi_{AP,k}$ and $h_{AP,k}$ represent the coordinates of the $k^{th}$ WLAN AP (longitude, latitude, and altitude). By using the Taylor expansion for (29) and ignoring high-order errors, the range error model is given in $$\delta d \approx e_k^T \cdot [\delta\lambda \ \delta\varphi \ \delta h]^T + \left(\frac{\ln 10 \cdot d_k}{10 \cdot n}\right) b_{RSS} \quad (31)$$

where $$e_k = \begin{bmatrix} e_{kx} \\ e_{ky} \\ e_{kz} \end{bmatrix} = \left(1 + \frac{\ln 10 \cdot b_{RSS}}{10 \cdot n}\right) \begin{bmatrix} (\lambda - \lambda_{AP,k})(N+h)\cos\varphi/d_k \\ (\varphi - \varphi_{AP,k})(M+h)/d_k \\ h - h_{AP,k}/d_k \end{bmatrix} \quad (32)$$

Therefore, the observation model for the range differences is given by $$\delta z_d = \begin{bmatrix} d_{MEMS,1} - d_{WiFi,1} \\ \vdots \\ d_{MEMS,m} - d_{WiFi,m} \end{bmatrix} \quad (33)$$

$$= \begin{bmatrix} e_{1x} & e_{1y} & e_{1z} \\ \vdots & \vdots & \vdots \\ e_{mx} & e_{my} & e_{mz} \end{bmatrix} \begin{bmatrix} \delta\lambda \\ \delta\varphi \\ \delta h \end{bmatrix} + \begin{bmatrix} \frac{\ln 10 \cdot d_1}{10 \cdot n} \\ \vdots \\ \frac{\ln 10 \cdot d_m}{10 \cdot n} \end{bmatrix} b_{RSS} + \begin{bmatrix} v_{d_1} \\ \vdots \\ v_{d_m} \end{bmatrix}$$

$$= G_{m \times 3} [\delta\lambda \ \delta\varphi \ \delta h]^T + B_{m \times 1} \cdot b_{RSS} + v_{d,m \times 1}$$

Finally, the observation model for TC integration is written as $$\delta z = H\delta x + v \quad (34)$$

where $\delta z = \delta z_d$ represents the measurement vector, and $v = v_{d,m \times 1}$ represents the measurement noise vector, and H is the design matrix, which is expressed as $$H = [G_{m \times 3} \ 0_{m \times 12} \ B_{m \times 1}] \quad (35)$$

Blunder Elimination

EKF is used to fuse the MEMS sensors based ranges and WLAN based ranges. Blunders from very noisy RSS values, caused by several factors such as multipath effect, can be detected by using hypothesis testing on the innovations of the EKF. When using EKF, the following two conditions may be assumed: (1) the measurement errors are zero-mean, white, and Gaussian distributed; (2) the process noise is zero-mean, white and Gaussian distributed. Based on these assumptions, the innovation sequence will be zero-mean, white and Gaussian distributed. The equations for the innovation sequence can be given as $$v_k = z_k - \hat{z}_{k|k-1} \quad (36)$$

where $v_k$ is the innovation, $z_k$ is the observed measurement, and $\hat{z}_{k|k-1}$ is the predicted measurement. The innovations have the following covariance matrix:

$$C_{v_k} = H_k P_{k|k-1} H_k^T + R_k \quad (37)$$

where $C_{v_k}$ is the covariance matrix of the innovation, $H_k$ is the design matrix, $P_{k|k-1}$ is the state covariance matrix, and $R_k$ is the measurement covariance matrix.

Given the assumptions stated above, the innovation sequence is distributed as $$v_k \sim N(0, C_{v_k}) \quad (38)$$

where N ($\mu$, $C_\alpha$) represents the normal distribution with mean of $\mu$ and covariance of $C_\alpha$. The confidence intervals for the individual measurements are then calculated. If these are violated, the measurement is considered a blunder, and removed from the fusion.

Test Results and Performance Analysis

Figure 5:
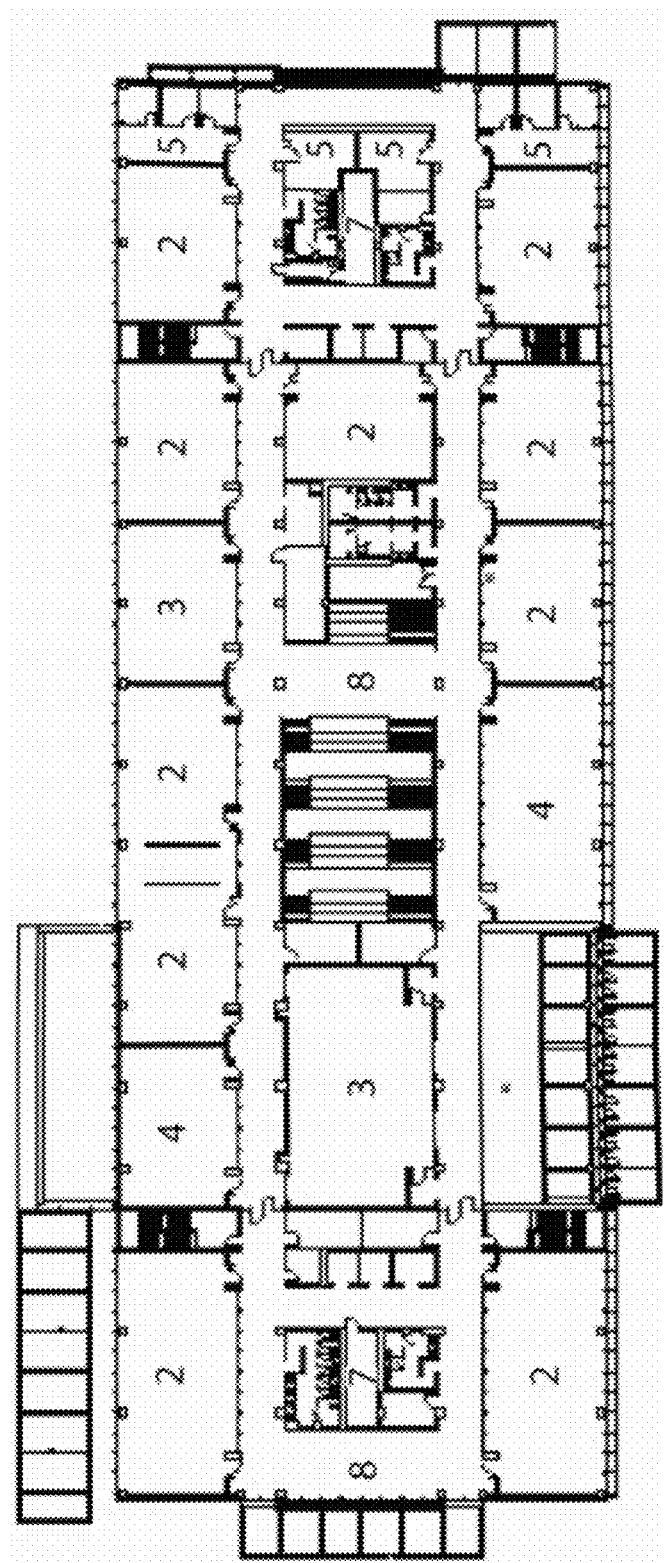
FIG. 5 shows the field test area: building E (about 120 m×40 m).

To evaluate the performance of the disclosed pedestrian navigation methods and systems, several experiments were performed with three different devices (smartphones). Three pedestrians were involved in collecting field experiment data. Smartphones that contain an accelerometer triad, a gyroscope triad, and WLAN were used to collect the experimental data. The field experiment data was collected in building E (about 120 m×40 m) as shown in FIG. 5. Three tasks were carried out in the field tests. The first task validated the performance of the disclosed method for the MEMS sensors based pedestrian navigation. This section also compared the disclosed MEMS solution with traditional PDR and INS algorithms. The second task showed the performance of the disclosed LC integration of MEMS sensors based navigation solution and trilateration-based WLAN positioning solutions. This section also compared this LC integration solution with MEMS, PDR, and INS solutions. The disclosed LC integration of MEMS sensors based navigation solution and fingerprinting-based WLAN positioning solutions are not shown because it is similar to the LC integration of MEMS sensors based navigation solution and trilateration-based WLAN positioning solutions. The last task demonstrated the performance of the disclosed TC integration of WLAN and MEMS sensors, and compared it with the LC integration, MEMS, PDR, and INS.

Disclosed MEMS Sensors Based Pedestrian Navigation

Figure 6A:
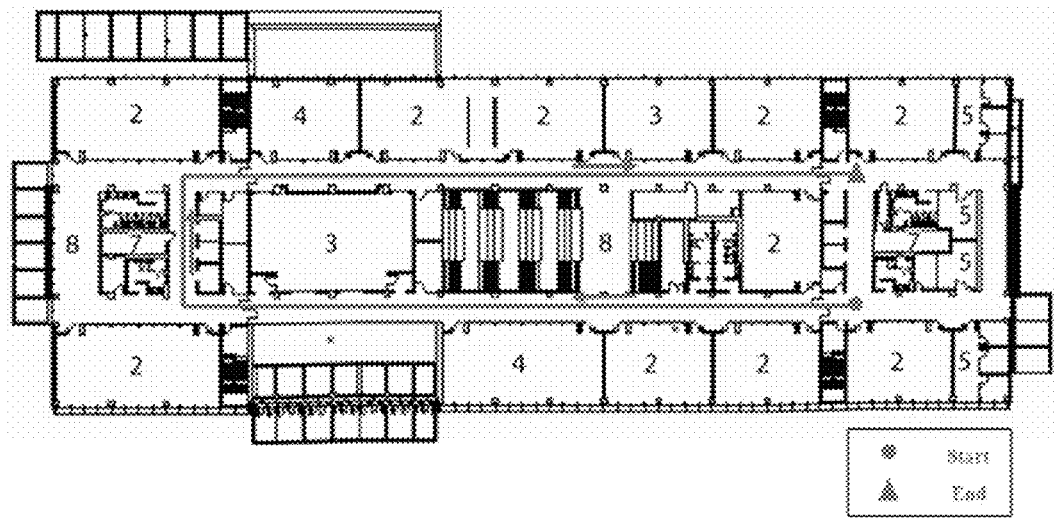
FIG. 6A shows an experimental trajectory (Trajectory I) in building E for evaluating the performance of the present MEMS sensors based navigation solution.
Figure 6B:
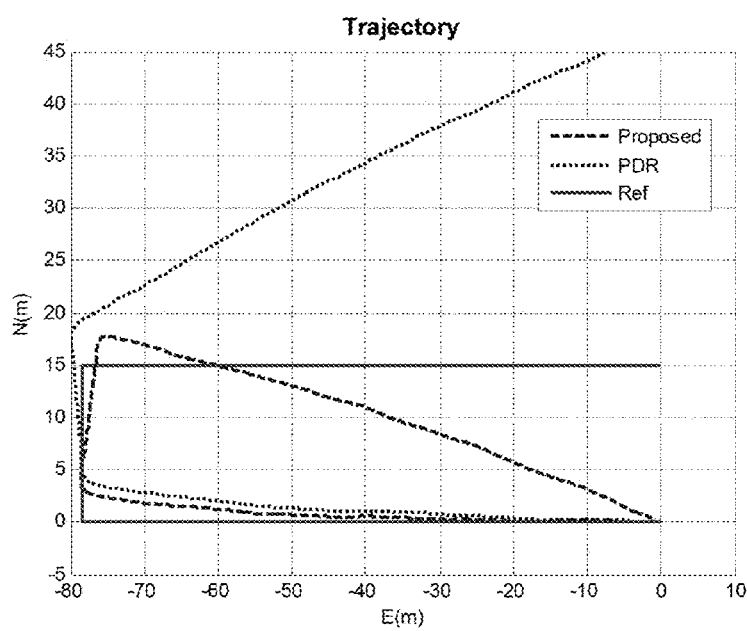
FIG. 6B shows PDR based and the present MEMS sensors based navigation solutions as well as a reference trajectory.

One experimental trajectory (Trajectory I), collected by a pedestrian with a device (smartphone) in the building E, were used to evaluate the performance of the disclosed MEMS solution as shown in FIG. 6A. The disclosed MEMS solution, PDR solution, and the reference trajectory in this experimental trajectory are shown in FIG. 6B. In FIG. 6B, maximum navigation errors for the present method and traditional PDR are about 12 and 34 meters, separately. This shows that the disclosed MEMS solution performs better than the PDR. The average heading drift of the disclosed method is also smaller than the PDR.

Figure 7:
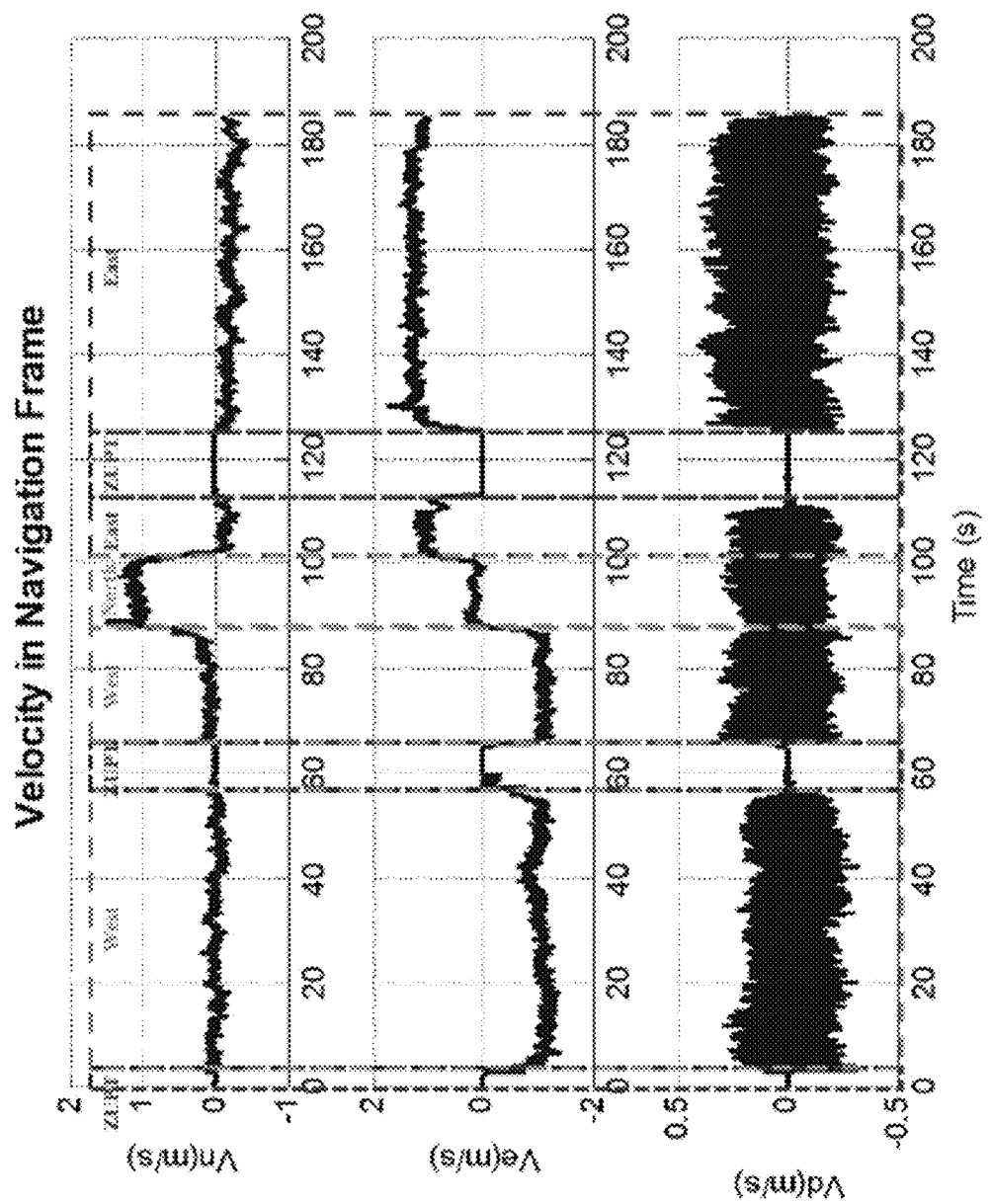
FIG. 7 shows the velocity solution of the present MEMS sensors based navigation solution.
Figure 8:
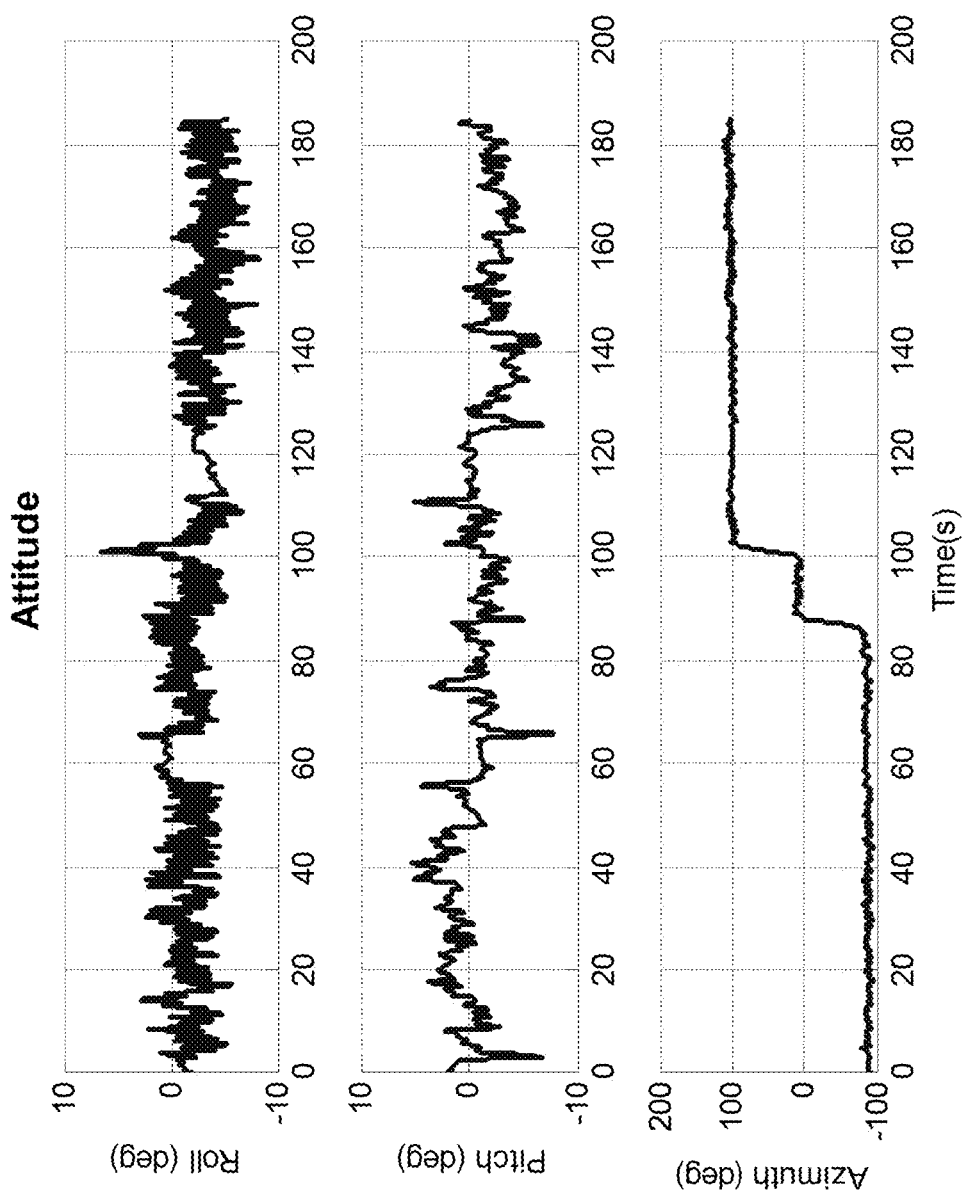
FIG. 8 shows the attitude solution of the present MEMS sensors based navigation solution.

The velocity solution of the disclosed method is shown in FIG. 7. FIG. 7 clearly shows the user's moving status: a) keeps static (ZUPT), b) walks west, c) keeps static (ZUPT), d) walks west, e) walks north, f) walks east, g) keeps static (ZUPT), and h) walks east. The moving trend successfully fits the trajectory in FIG. 6 (*b*). The walking speed is in the typical range of a normal person. The pseudo-velocity update and ZUPT play an important role in accurately estimating the user's velocity. Without the pseudo-velocity update and ZUPT, the estimated velocity and position solution drifts quickly. The attitude solution of the disclosed method is shown in FIG. 8. Roll and pitch angles are between −10 degrees and 10 degrees in this trajectory. The estimated azimuth trend is as follows: a) about −90 degrees, b) about 0 degree, and c) about 100 degrees. The true azimuth trend is as follows: a) −90 degrees, b) 0 degree, and c) 90 degrees. The estimated azimuth from the disclosed MEMS method is close to the true azimuth.

Figure 9A:
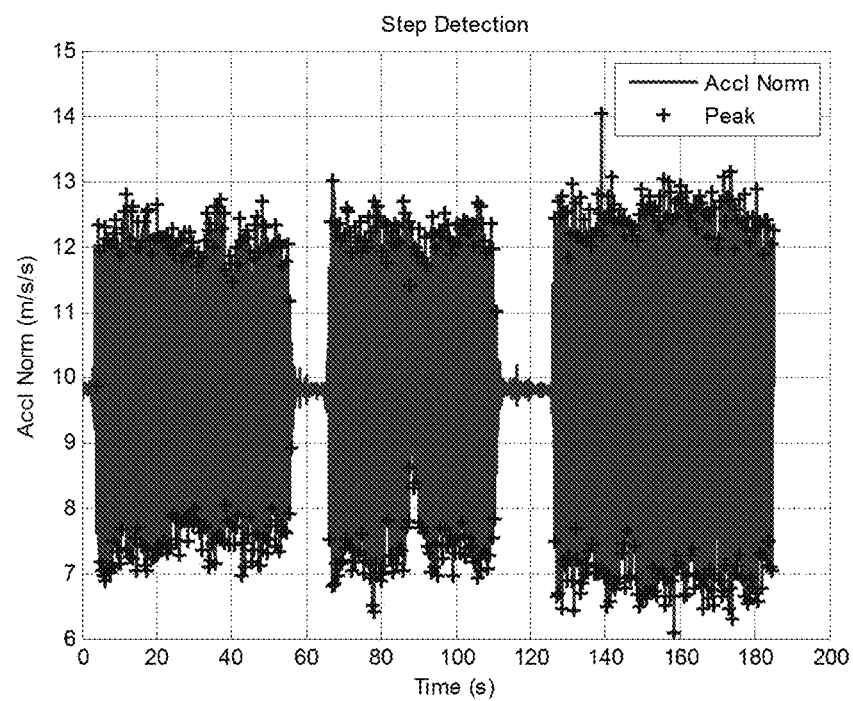
FIG. 9A shows a result of step detection in Trajectory I.
Figure 9B:
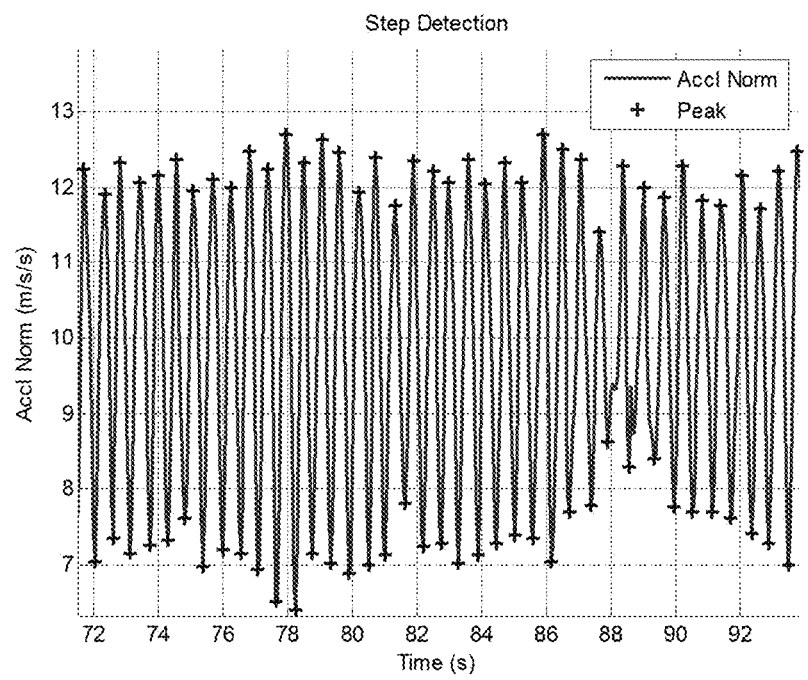
FIG. 9B shows a zoom-in on some parts of step detection in this trajectory.
Figure 10:
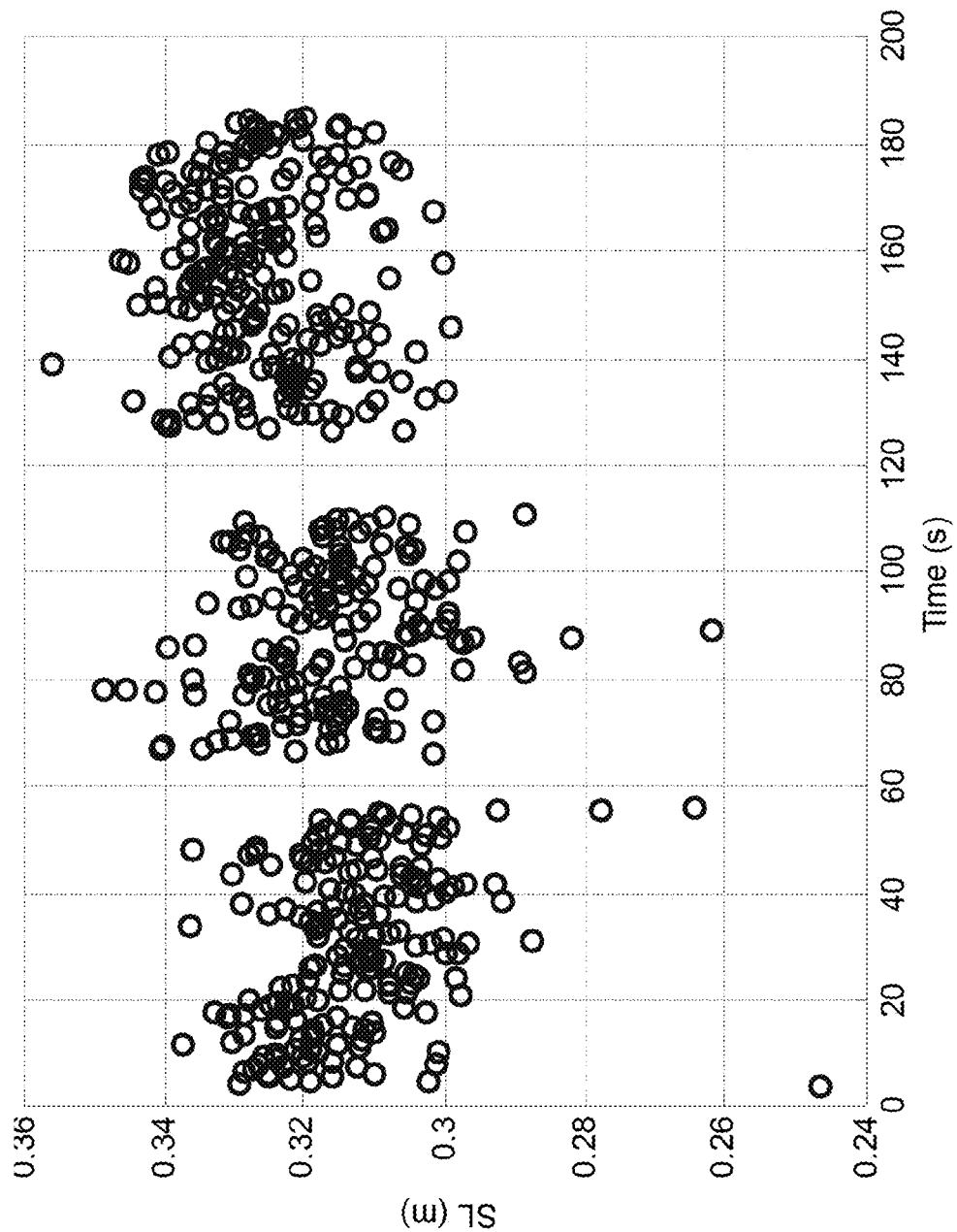
FIG. 10 shows a result of step length estimation.
Figure 11:
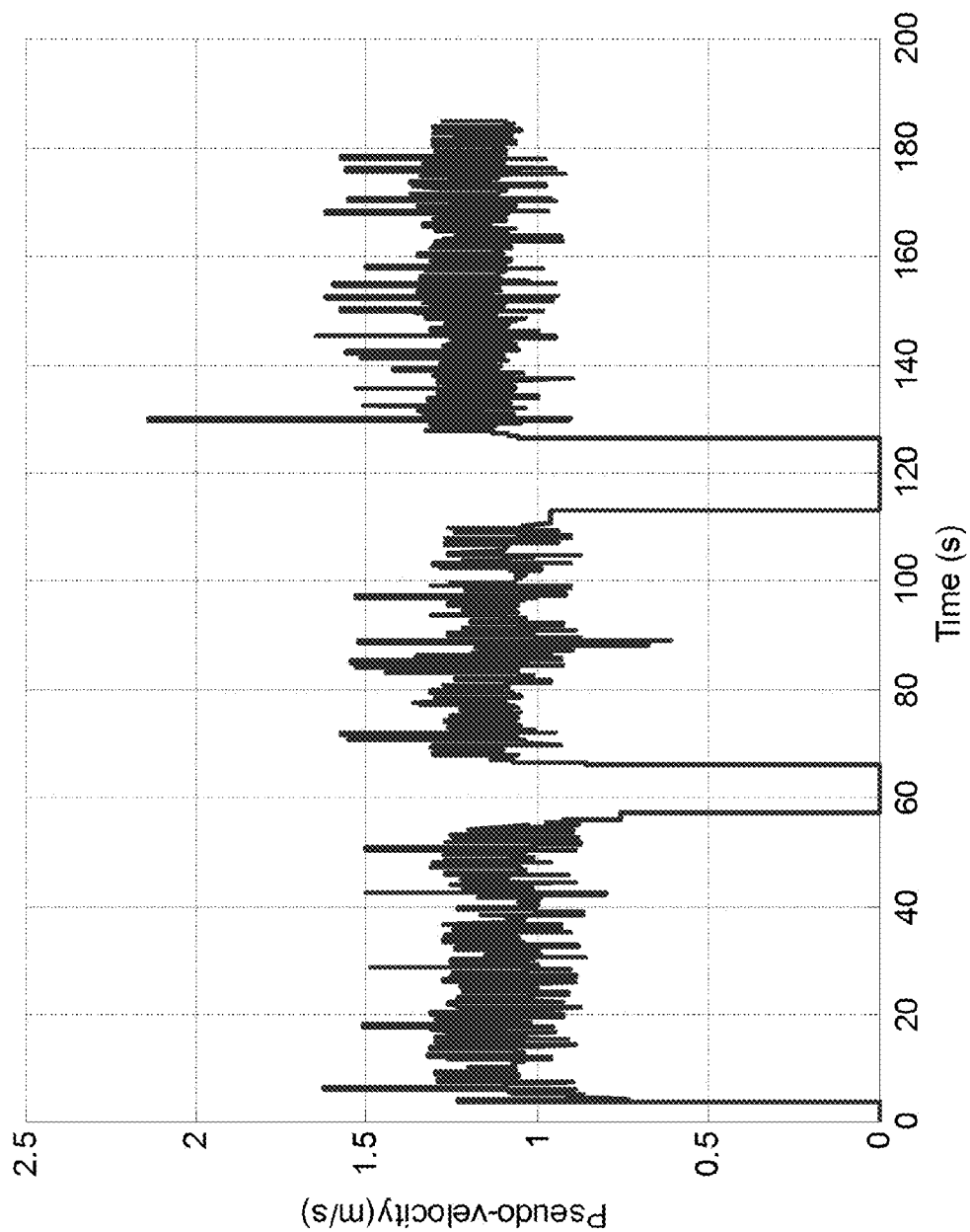
FIG. 11 shows a result of pseudo-velocity derived from the step length.

The results of the step detection, step length estimation, and pseudo-velocity are shown and discussed as follows. The step detection results are shown in FIG. 9A. In this figure, acceleration norm and detected peaks are described by "−" and "+". FIG. 9B zooms in on some parts of the trajectory which shows that the step detection algorithm can successfully detect the peaks and steps. The step length estimation result is shown in FIG. 10. The user's step length is around 0.32 meters as shown in this figure. The step-length-derived pseudo-velocity is shown in FIG. 11. The pseudo-velocity is calculated from the step length. The average velocity of this user is about 1.20 m/s.

Figure 12:
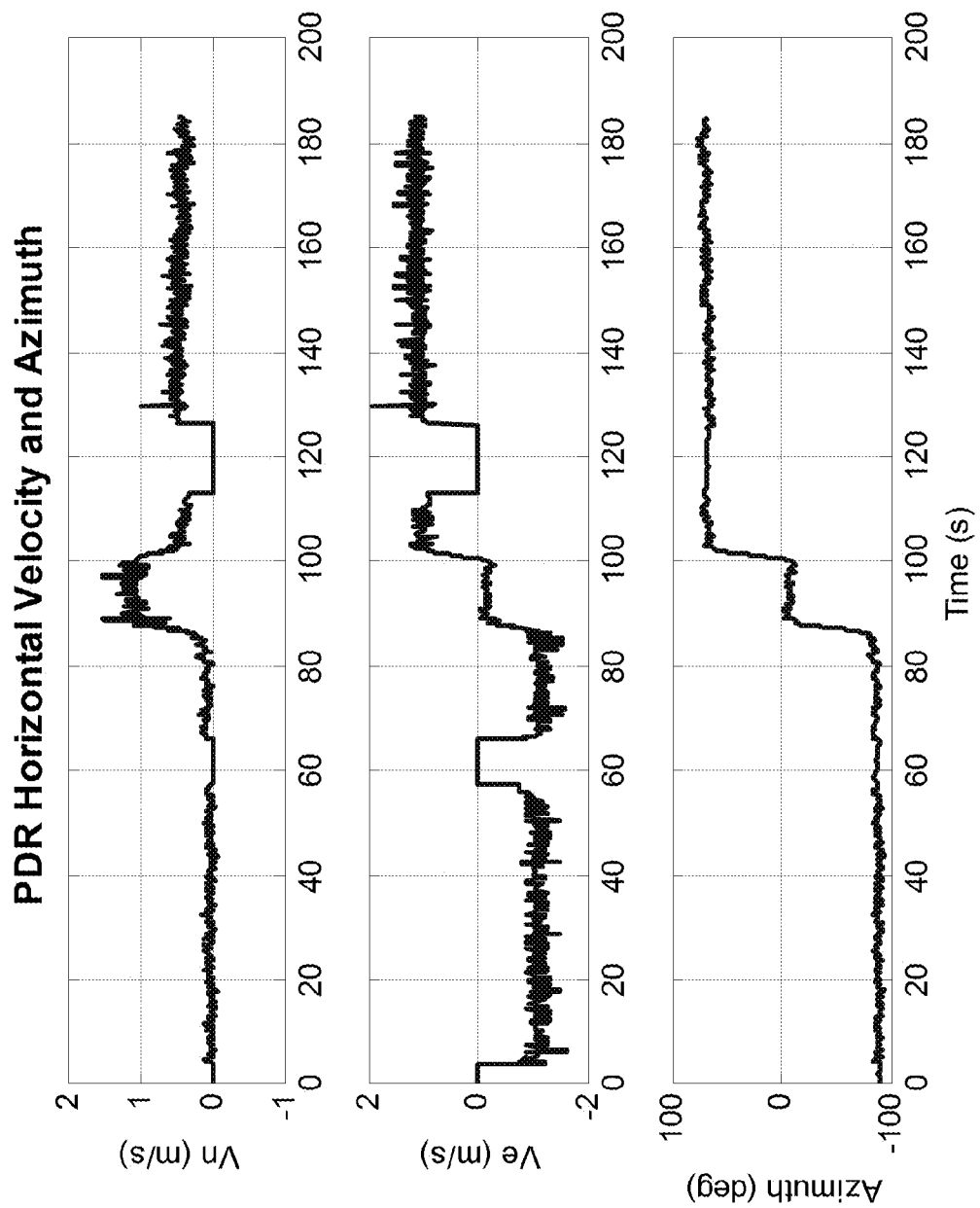
FIG. 12 shows a result of PDR horizontal velocity and azimuth.

In order to illustrate the performance of the disclosed MEMS sensors based navigation solution, results of the PDR and INS are also shown in this invention. Pure PDR results are shown in FIG. 6B and FIG. 12. The results of PDR do not drift significantly in the first 100 seconds. However, navigation errors of PDR accumulate quickly in the last few seconds. The azimuth error, which is the main error source for the whole trajectory, reaches 20 degrees at the end of the trajectory.

Figure 13:
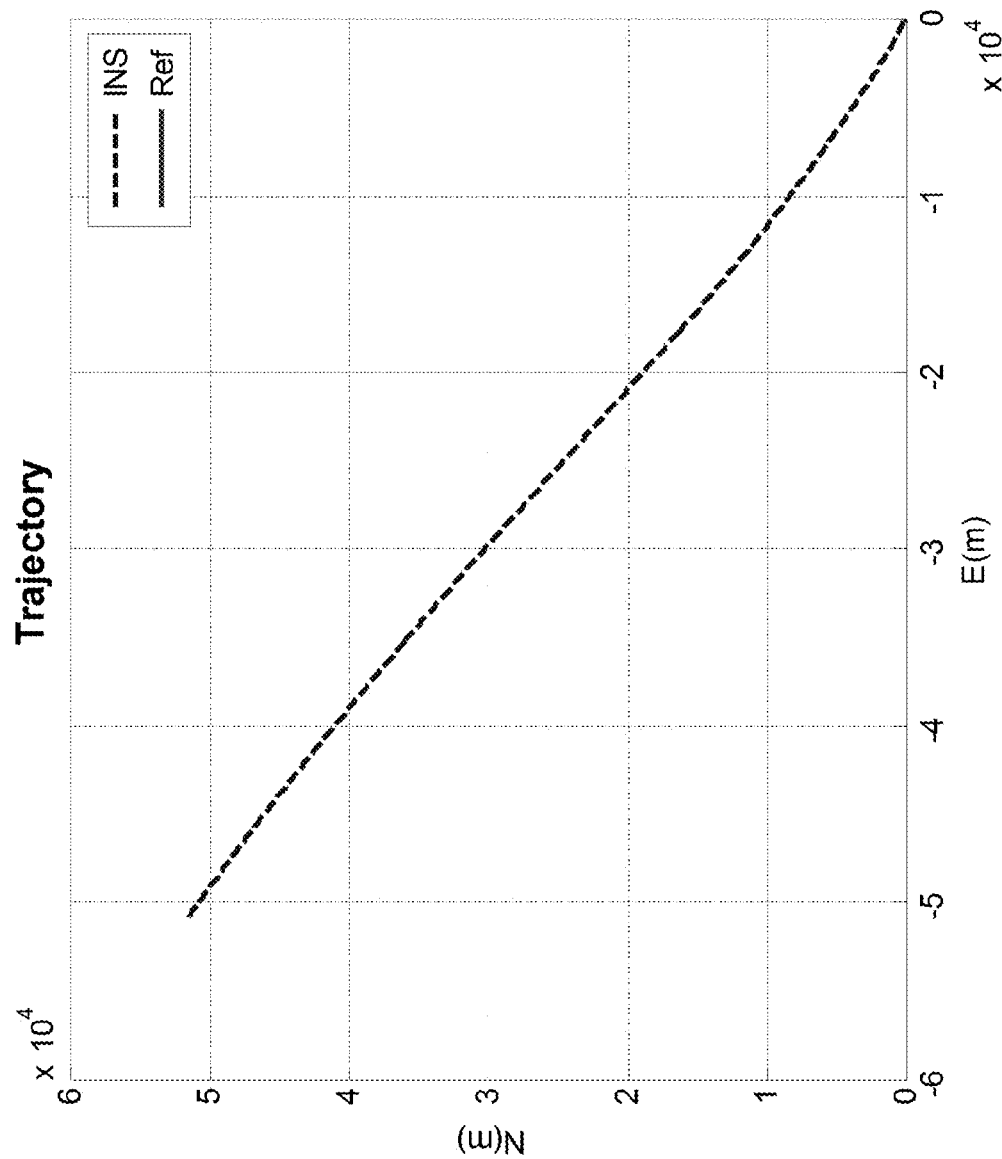
FIG. 13 shows an INS mechanization based navigation solution as well as a reference.
Figure 14:
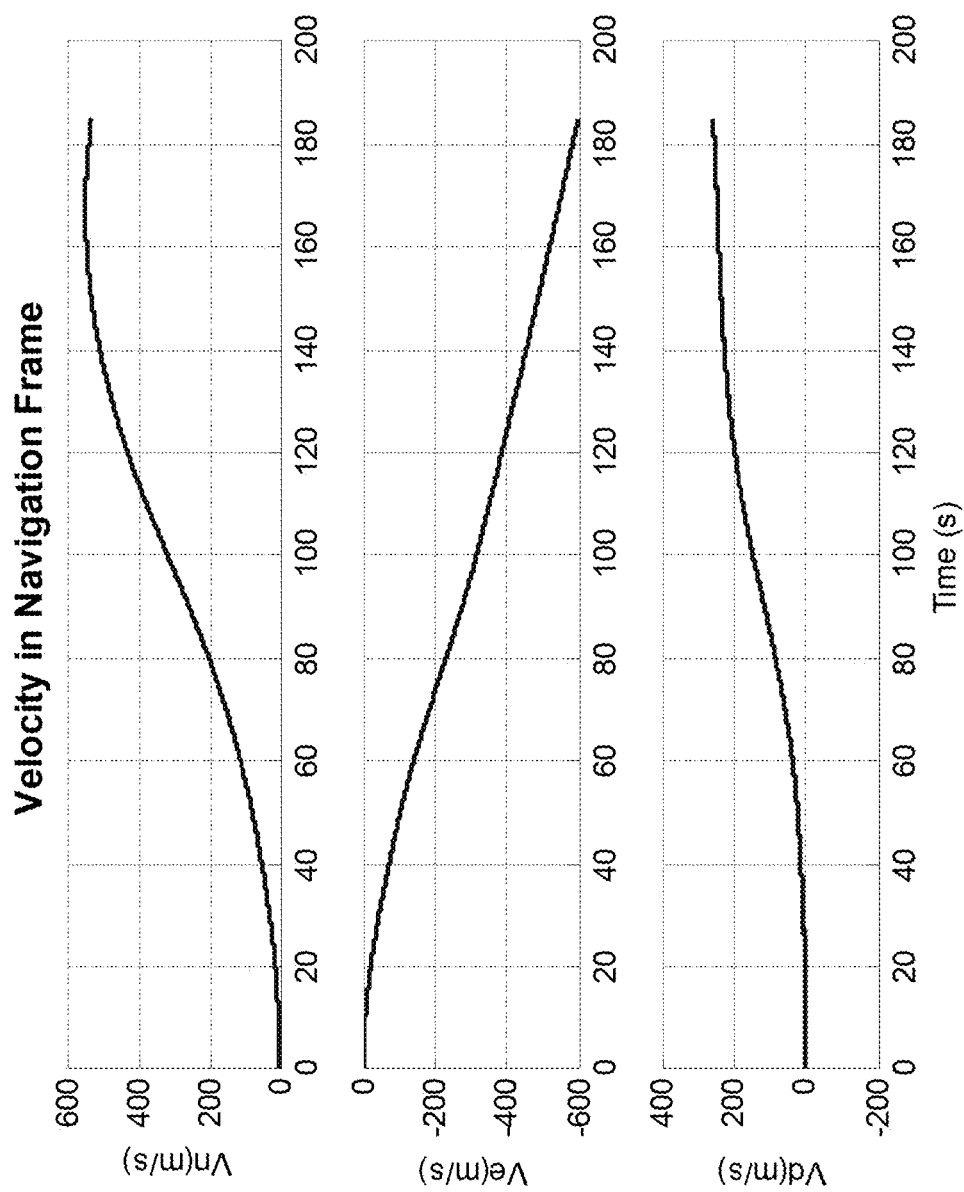
FIG. 14 shows an INS mechanization based velocity solution.
Figure 15:
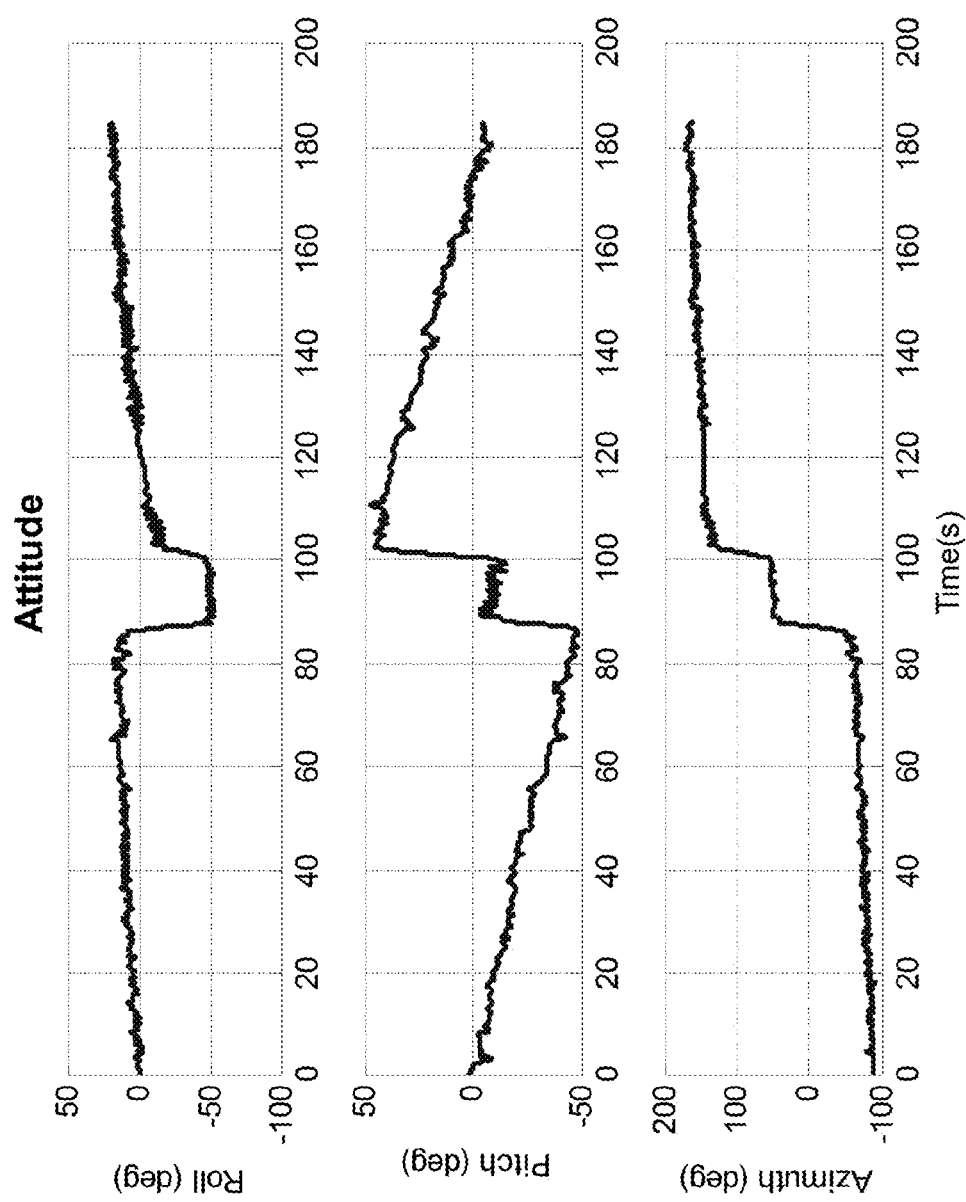
FIG. 15 shows an INS mechanization based attitude solution.
Figure 16A:
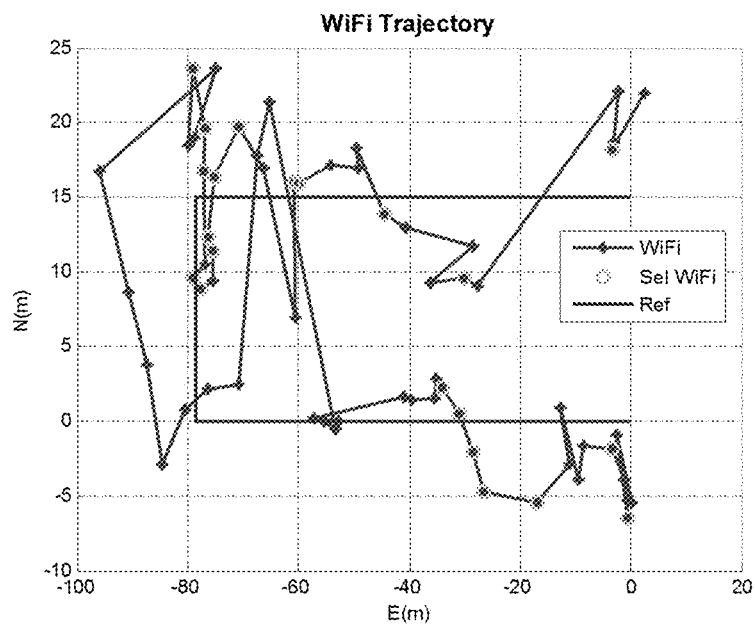
FIG. 16A shows the trajectory of the trilateration-based WLAN solution.
Figure 16B:
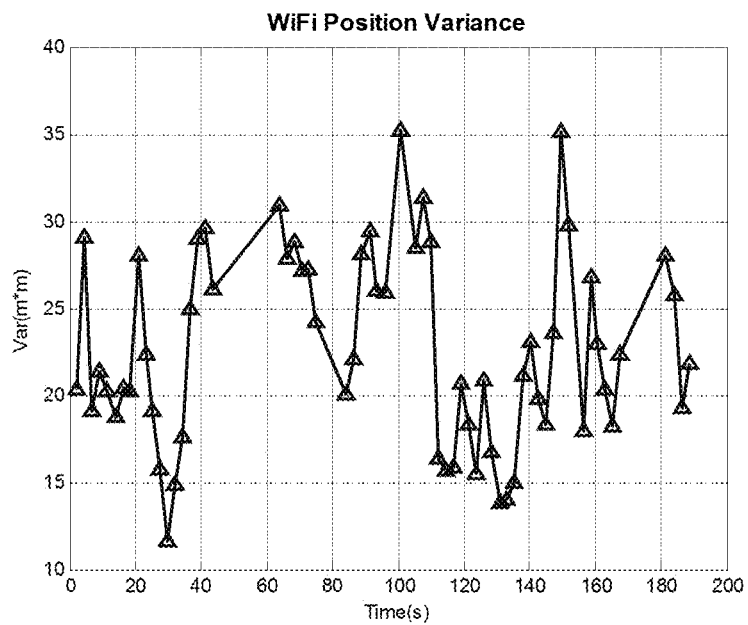
FIG. 16B shows the variances of the trilateration-based WLAN solution.

Results of the pure INS algorithm are shown in FIG. 13, FIG. 14, and FIG. 15. In FIG. 13, the horizontal position error accumulates quickly, and extends to about 80 km by the end of the trajectory. In FIG. 14, the velocity error achieves several hundred meters per second by the end of the trajectory. In FIG. 15, the attitude error reaches about 50 degrees by the end of the trajectory. As shown in FIG. 13, FIG. 14, and FIG. 15, INS navigation errors are much larger than errors of the PDR and the disclosed MEMS solution. Therefore, the INS solution will not be shown in the next set of figures for the comparison of navigation performance LC Integration of WLAN and MEMS Sensors The results (position and variance) of trilateration-based WLAN positioning in the trajectory I are shown in FIGS. 16A-B. The WLAN positioning result is unsatisfactory mainly because the RSS-derived ranges are noisy. To improve the performance of the integrated system, some WLAN positions with large variances are left out of the integration. In this disclosure, WLAN positions with variances of less than a pre-set threshold are selected for integration as shown in FIG. 16A-B.

The trajectory of the disclosed LC integration of WLAN and MEMS sensors in Trajectory I is shown as the "dash line" in FIGS. 16A-B. This trajectory is taken by "Pedestrian 1" using "Smartphone A". The disclosed MEMS solution, PDR, and the reference are shown as a "dash dot line", "dot line" and "solid line", respectively. The disclosed MEMS solution drifts less than the PDR solution. Selected WLAN positions are also shown as "circles" in FIG. 16. With the help of the selected WLAN positions, the LC integration of WLAN and MEMS sensors drifts less than the MEMS solution as shown in FIG. 16. The performance of LC solution is also better than the WLAN solution when one compares FIG. 16A with FIG. 17.

Figure 17:
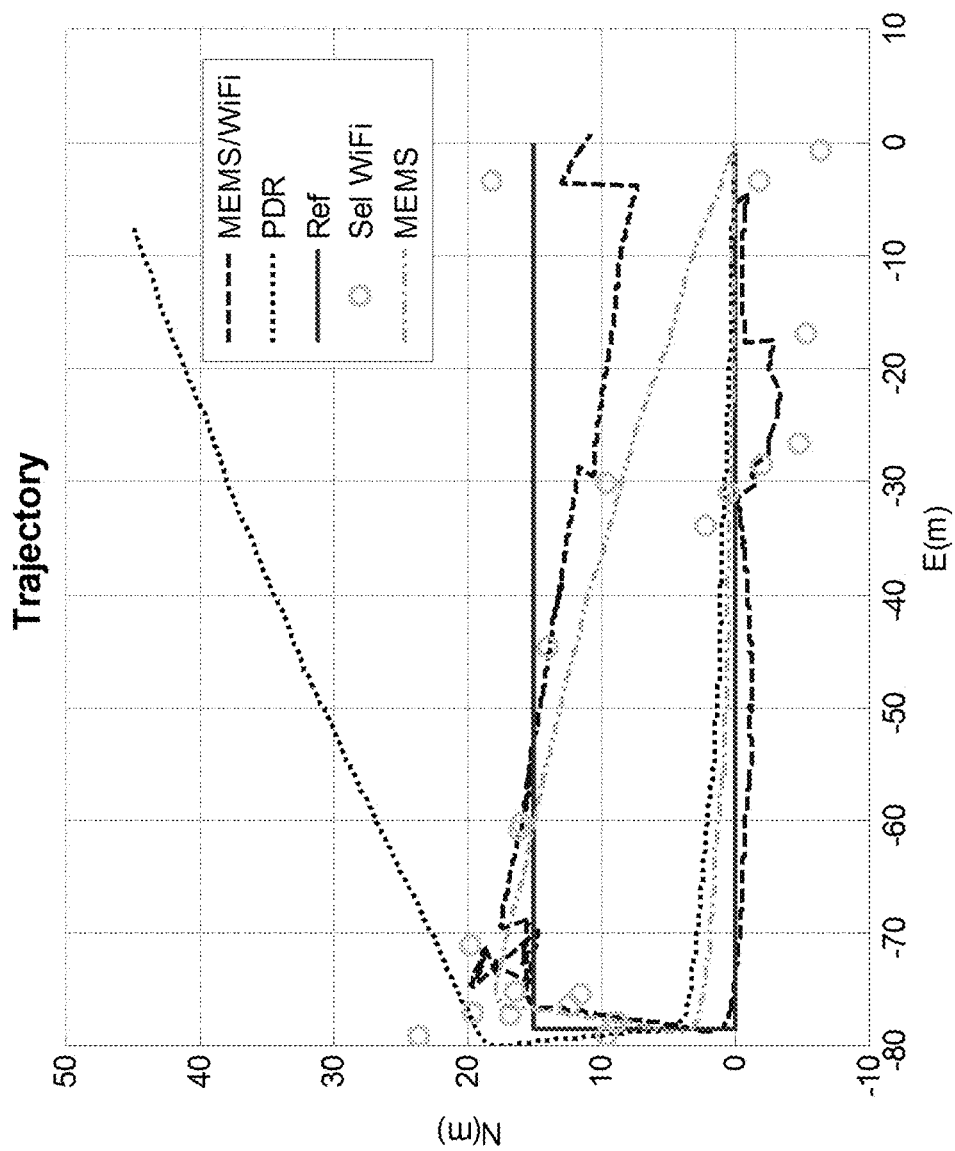
FIG. 17 shows the navigation solutions of MEMS, PDR, and WLAN/MEMS LC integration in Trajectory I.

The cumulative error percentages of MEMS, PDR, and LC integration of WLAN and MEMS sensors (Trajectory I) are shown in FIG. 17. The positioning performance of different algorithms in Trajectory I are depicted in Table 1. As shown in FIG. 17 and Table 1, LC integration has the best navigation performance, and the PDR has the worst navigation performance

TABLE 1

Positioning performance of different algorithms in Trajectory I

| Algorithm | Error (m) | | | |
| --- | --- | --- | --- | --- |
| | Maximum | Minimum | Mean | RMS |
| PDR | 31.48 | 0.00 | 8.44 | 12.57 |
| MEMS | 13.93 | 0.00 | 2.91 | 4.40 |
| LC(MEMS/WLAN) | 8.22 | 0.00 | 2.91 | 3.73 |

TC Integration of WLAN and MEMS Sensors

Figure 18:
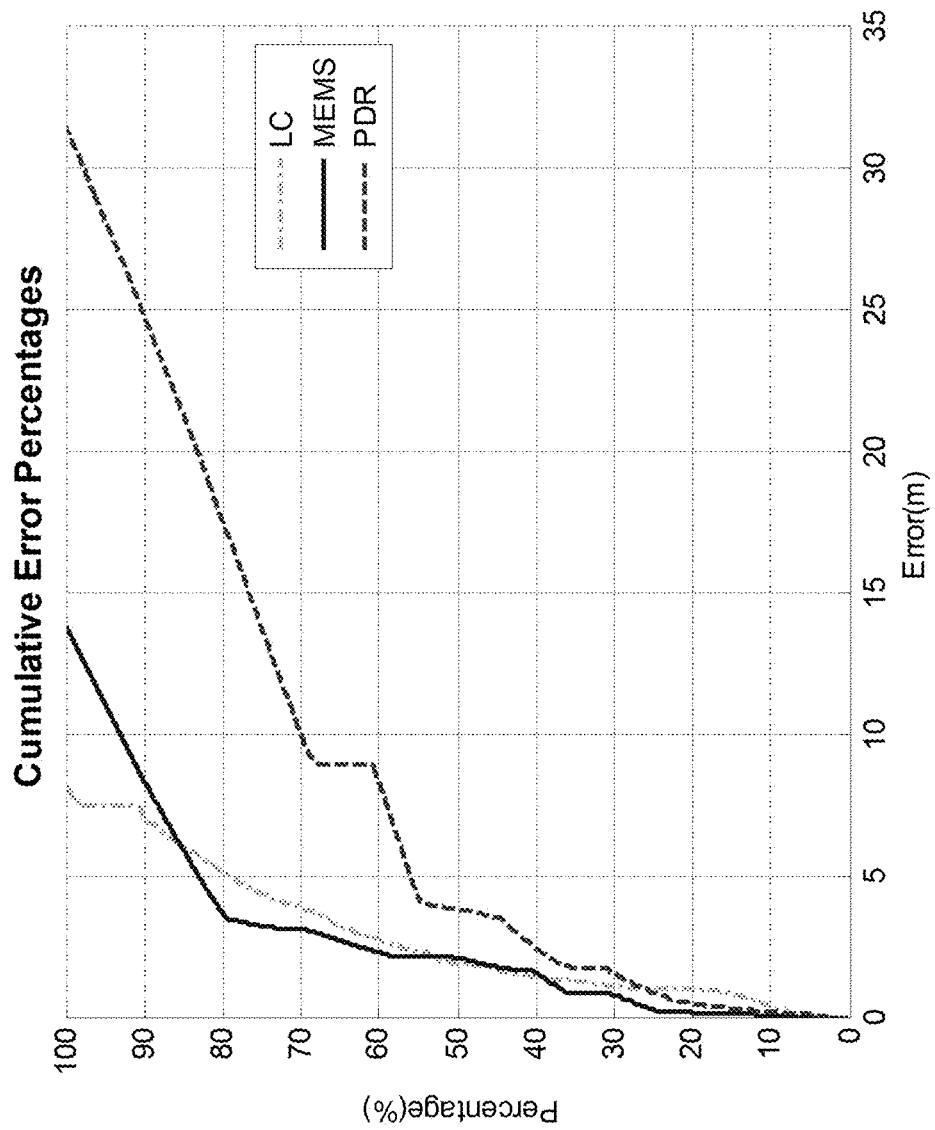
FIG. 18 shows the cumulative errors percentages of MEMS, PDR, and WLAN/MEMS LC integration in Trajectory I.

To evaluate the performance of TC integration of WLAN and MEMS sensors, several experiments were performed with three different devices (smartphones). Three pedestrians were involved in collecting field experiment data. Smartphones that contain an accelerometer triad, a gyroscope triad, and WLAN were used to collect this data. Three experimental trajectories taken by separate pedestrians with various smartphones were in building E (about 120 m×40 m) as shown in FIGS. 18A-C. The average number of observable WLAN APs is about 20 in building E.

Figure 19A:
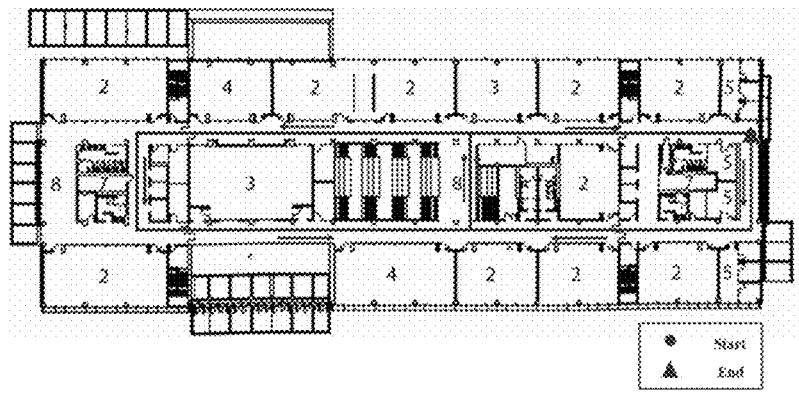
FIG. 19A shows experimental trajectories in building E for evaluating the performance of several navigation solutions at Trajectory II.
Figure 19B:
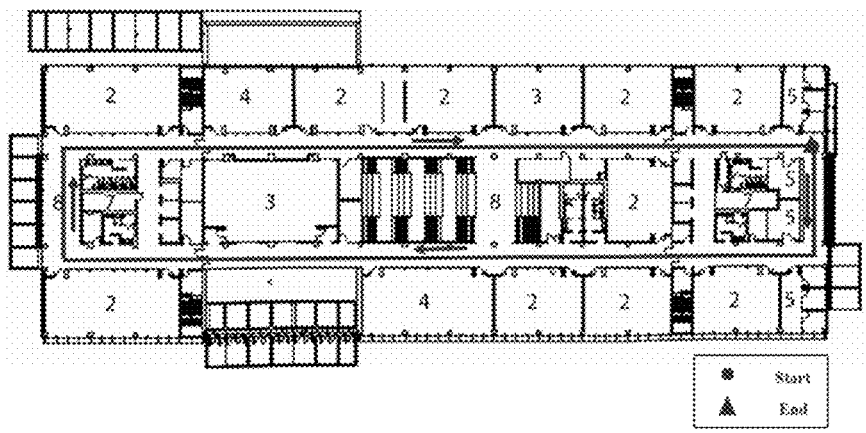
FIG. 19B shows experimental trajectories in building E for evaluating the performance of several navigation solutions at Trajectory III.
Figure 19C:
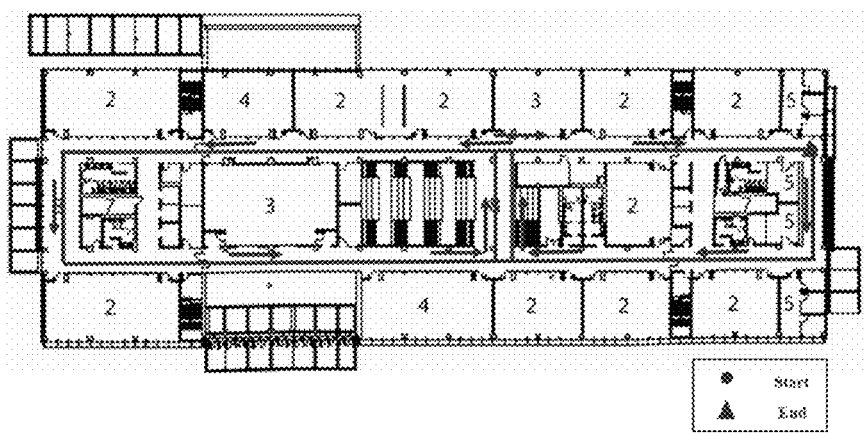
FIG. 19C shows experimental trajectories in building E for evaluating the performance of several navigation solutions at Trajectory IV.
Figure 20A:
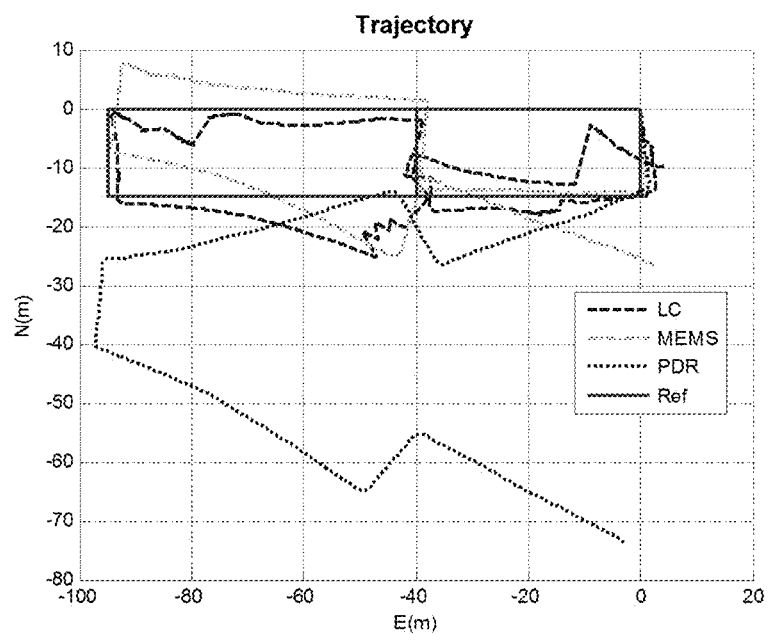
FIG. 20A shows the navigation solutions in Trajectory II, for Pedestrian 1, Smartphone A, using PDR, MEMS, and WLAN/MEMS LC integration.
Figure 20B:
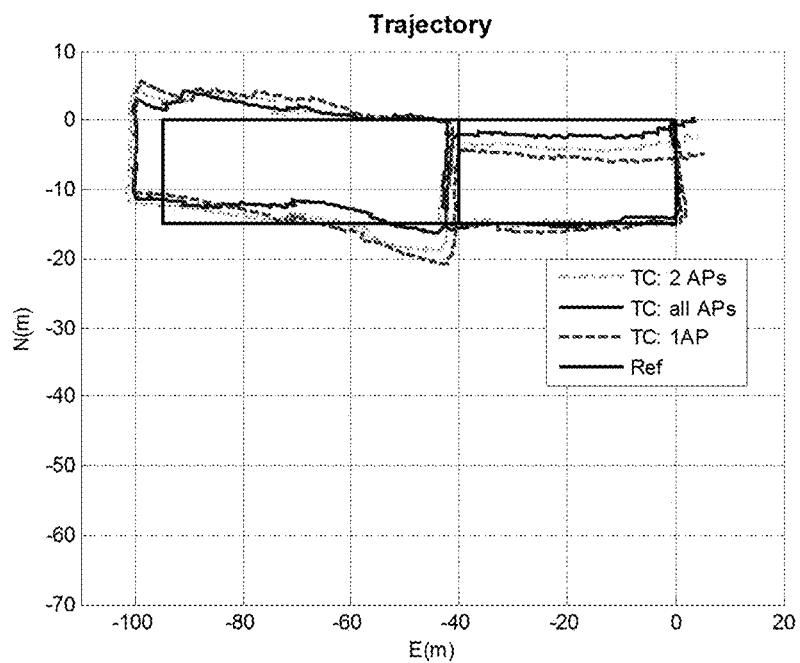
FIG. 20B shows the navigation solutions in Trajectory II, for Pedestrian 1, Smartphone A, using WLAN/MEMS TC integration using different numbers of APs.
Figure 21:
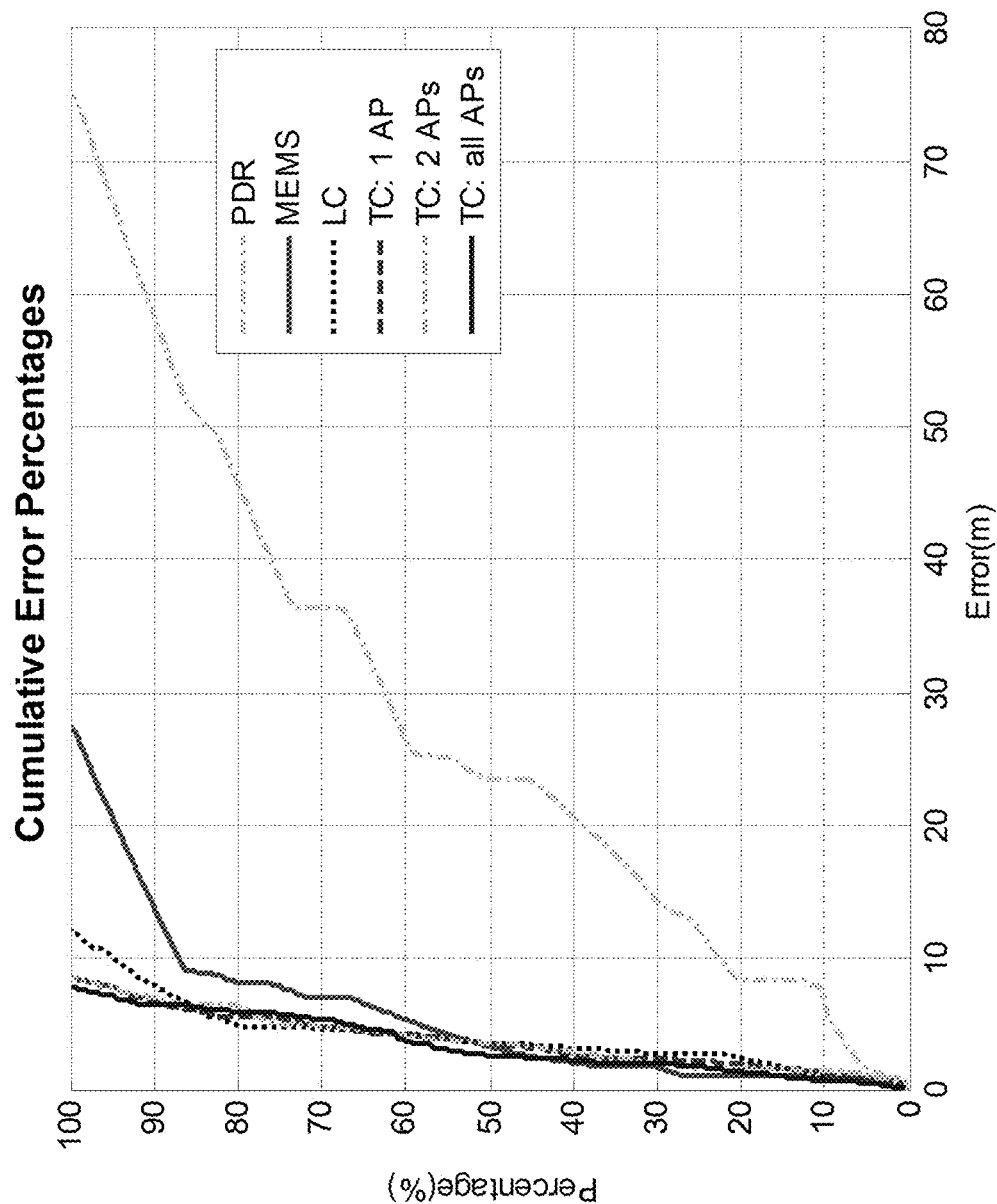
FIG. 21 shows the cumulative error percentages of PDR, MEMS, WLAN/MEMS LC integration and WLAN/MEMS TC integration using different numbers of APs in Trajectory II.

"Pedestrian 1" using "Smartphone A" performed the first experiment in nearly 5 minutes. The navigation solutions and error probabilities of different approaches in Trajectory II are shown in FIGS. 19A-B and FIG. 20, respectively. The approaches used for navigation performance comparison include PDR, MEMS, LC WLAN/MEMS integration and TC WLAN/MEMS integration. The disclosed MEMS-based navigation solution had an RMS position error of 10.83 m, which is more accurate than the PDR RMS position error of 27.79 m. The traditional INS navigation results are not depicted in FIGS. 19A-B and FIG. 20 due to their large RMS position error of 13855.30 m. The disclosed TC WLAN/MEMS integration, using all observable APs, had a RMS position error of 3.72 m, which is better than the RMS position error of the LC integration, which was 4.87 m. This difference is due to the contribution of estimating the RSS bias. As shown in FIGS. 19A-B and FIG. 20, navigation solutions of TC integrations, using two selected APs and one selected AP, were used to illustrate the performance of TC integration in an environment of the sparse deployment of WLAN APs. This showed RMS position errors of 5.77 m and 5.87 m, respectively. Their navigation performance is worse than the TC integration which used all observable APs. However, they perform better than the disclosed MEMS solution. The results illustrate that TC integration can improve the navigation performance of the disclosed MEMS solution, even if less than 3 APs are observed.

"Pedestrian 2" using "Smartphone B" performed the second experiment for about 4 minutes. The navigation solutions and error probabilities of different approaches in Trajectory III are shown in FIGS. 21A-B and FIGS. 22A-B, respectively. The disclosed MEMS solution had a RMS position error of 11.02 m, which is better than the PDR RMS position error of 34.00 m. The disclosed TC WLAN/MEMS integration, using all observable APs, had a RMS position error of 4.19 m, which is slightly better than the 4.87 m RMS position error of the disclosed LC integration. With two selected APs and one selected AP, TC integrations had RMS position errors of 4.36 m and 4.44 m, respectively. Like the Trajectory II, their navigation performance was worse than the TC integration, which used all observable APs. However, both the previous two cases had a better navigation performance than in the disclosed MEMS solution. The results also illustrate that TC integration can improve the navigation performance of the MEMS solution even if less than 3 APs are observed. These outcomes confirm the results of the Trajectory II.

Figure 22A:
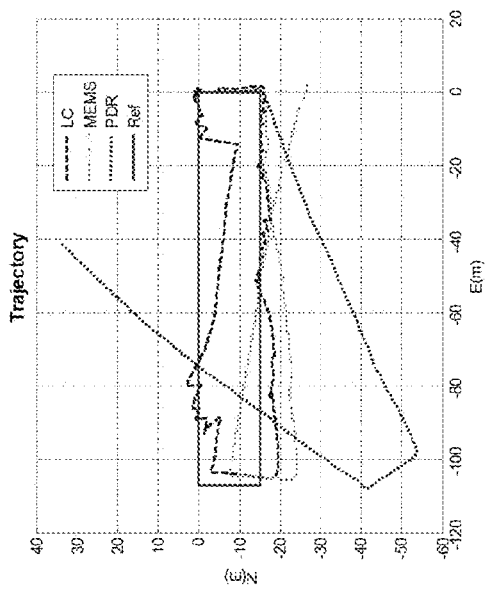
FIG. 22A shows the navigation solutions in Trajectory III, for Pedestrian 2, Smartphone B, using PDR, MEMS, and WLAN/MEMS LC integration.
Figure 22B:
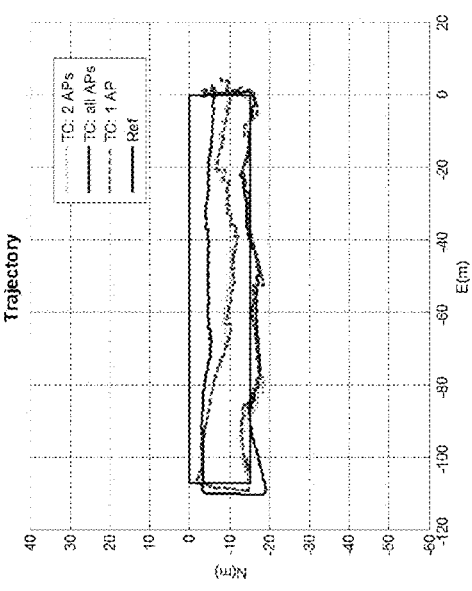
FIG. 22B shows the navigation solutions in Trajectory III, for Pedestrian 2, Smartphone B, using WLAN/MEMS TC integration using different umbers of APs.
Figure 23:
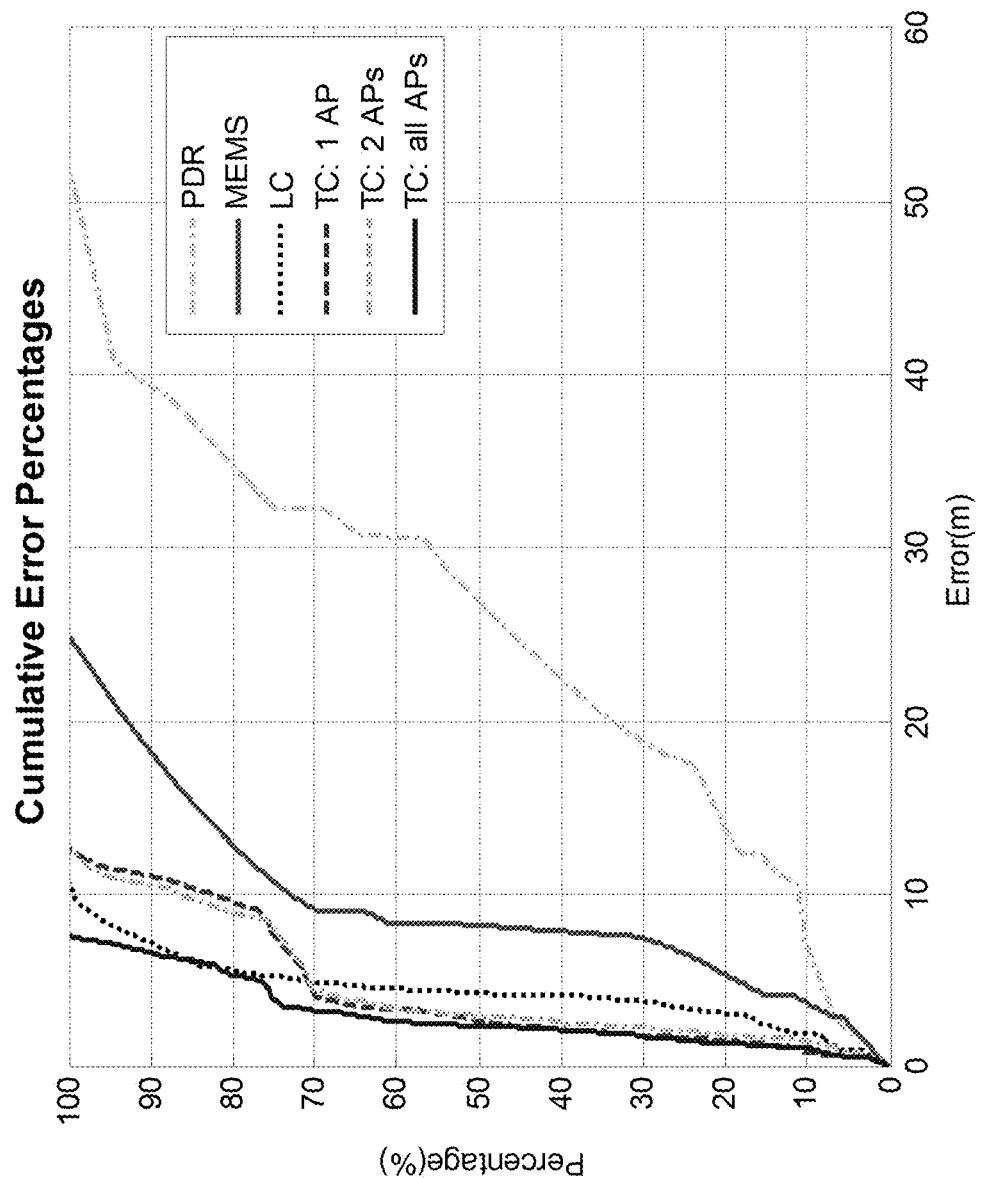
FIG. 23 shows the cumulative error percentages of PDR, MEMS, WLAN/MEMS LC integration and WLAN/MEMS TC integration using different numbers of APs in Trajectory III.

"Pedestrian 3" using "Smartphone C" performed the third experiment for approximately 5 minutes. The navigation solutions and error probabilities of different approaches in Trajectory IV are shown in FIGS. 22A-B and FIG. 23, respectively. The disclosed MEMS solution had a RMS position error of 10.39 m, which performed better than the PDR RMS position error of 45.96 m. The disclosed TC WLAN/MEMS integration, using all observable APs, had a RMS position error of 2.49 m, which was superior to the 7.95 m RMS position error of the disclosed LC integration. In this trajectory, the improvement from LC integration to TC integration is much more than in the other two trajectories. This is most likely because the RSS bias in the third experiment's trajectory is larger than the other two trajectories. With the successful estimation of the large RSS bias, TC integration has a better performance than LC integration. By using two selected APs and one selected AP, TC integrations had RMS position errors of 3.12 m and 4.13 m, respectively Similar to the other two trajectories, their navigation performance was worse than the TC integration, using all observable APs. However, they had a better navigation performance than the disclosed MEMS solution. These results further demonstrate the navigation performance of the disclosed TC integration. The navigation performance of different approaches in the three experiments are summarized in Table 2. This table also illustrates the efficiency of the disclosed pedestrian navigation methods whether in the presence or in the absence of WLAN routers.

TABLE 2

Summary of navigation performance of different approaches

| Algorithm | RMS Position Error (m) | | |
| --- | --- | --- | --- |
| | T1 | T2 | T3 |
| INS | 13855.30 | 49029.47 | 49528.85 |
| PDR | 27.79 | 34.00 | 45.96 |
| MEMS | 10.83 | 11.02 | 10.39 |
| LC | 4.87 | 4.87 | 7.95 |
| TC with all APs | 3.72 | 4.19 | 2.49 |
| TC with 2APs | 5.77 | 4.36 | 3.12 |
| TC with 1AP | 5.87 | 4.44 | 4.13 |

Figure 24A:
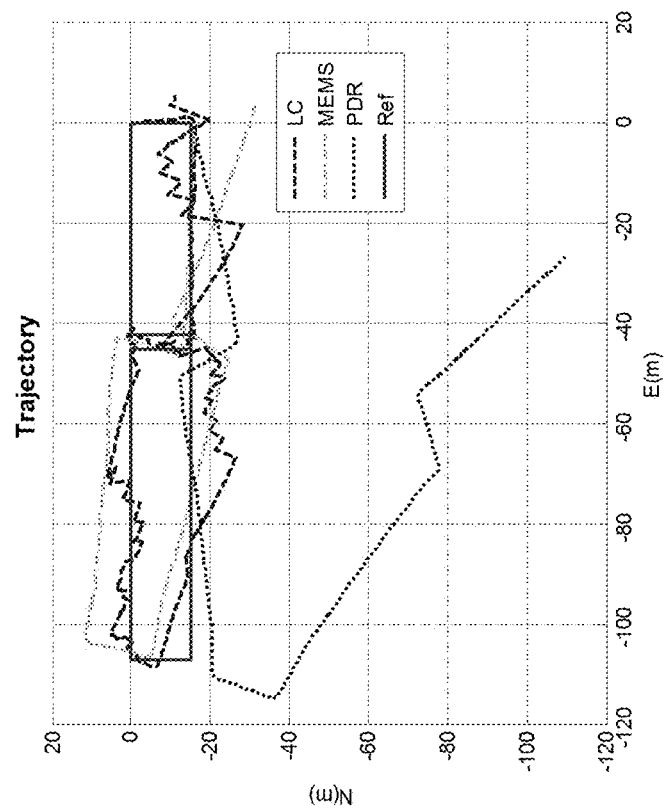
FIG. 24A shows the navigation solutions in Trajectory IV, for Pedestrian 3, Smartphone C, using PDR, MEMS, and WLAN/MEMS LC integration.
Figure 24B:
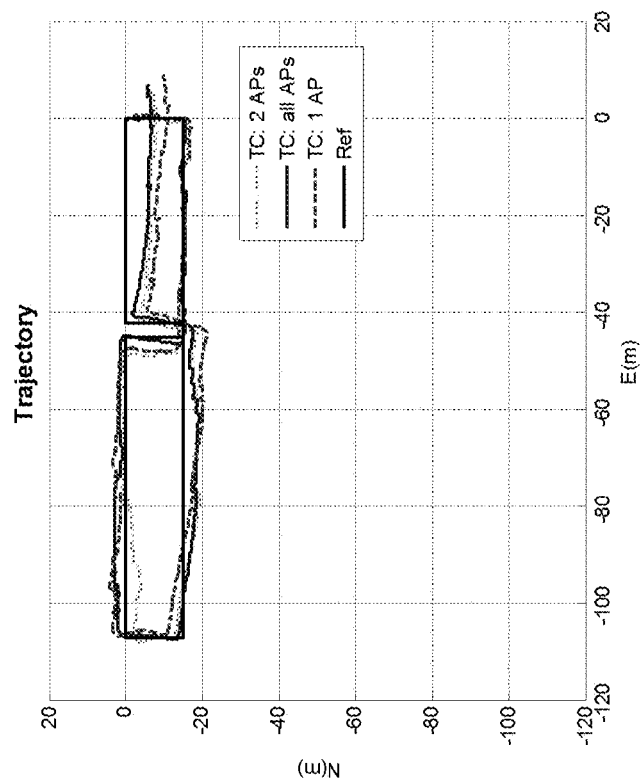
FIG. 24B shows the navigation solutions in Trajectory IV, for Pedestrian 3, Smartphone C, using WLAN/MEMS TC integration using different numbers of APs.
Figure 25:
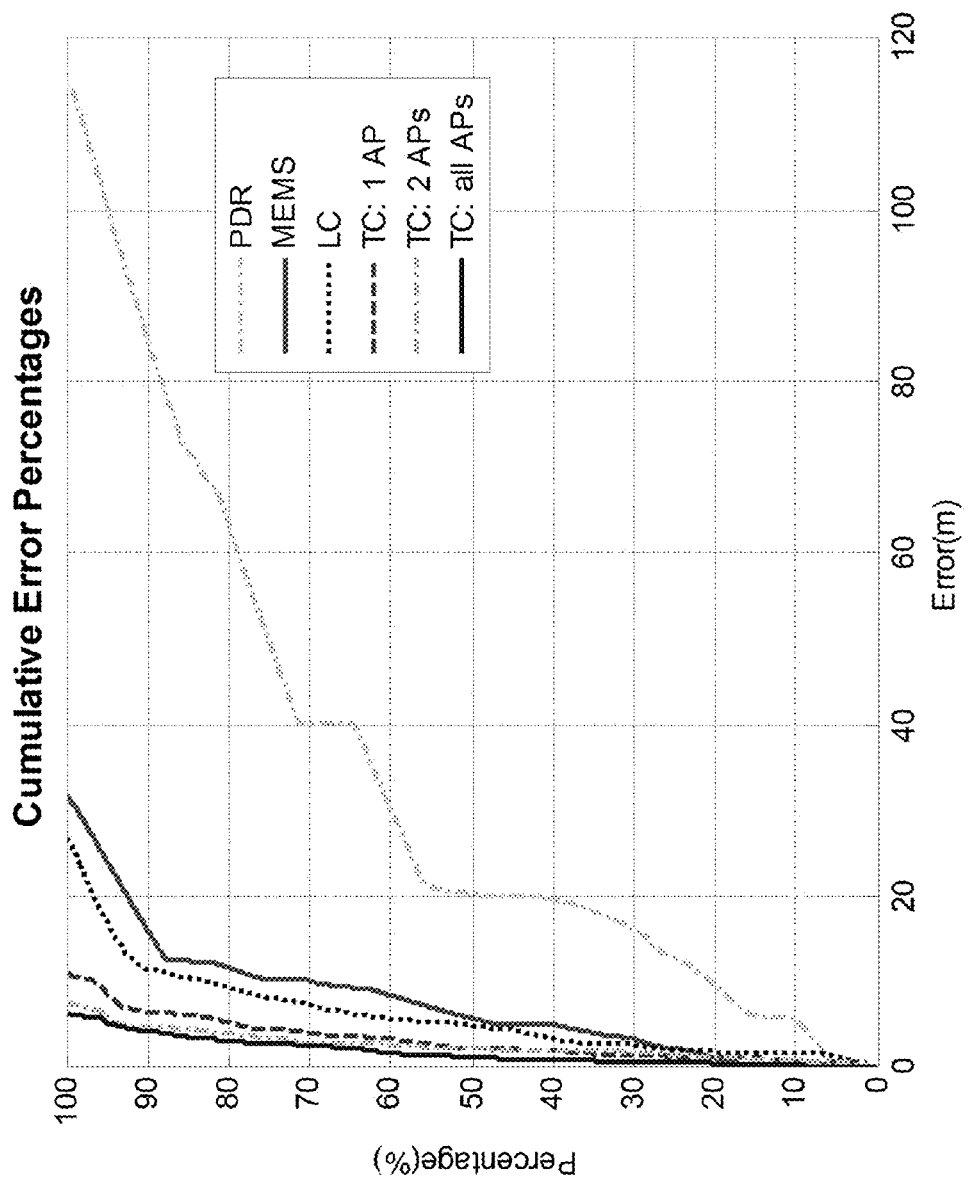
FIG. 25 shows the cumulative error percentages of PDR, MEMS, WLAN/MEMS LC integration and WLAN/MEMS TC integration using different numbers of APs in Trajectory IV.

FIG. 24B shows the navigation solutions in Trajectory IV, for Pedestrian 3, Smartphone C, using WLAN/MEMS TC integration using different numbers of APs. FIG. 25 shows the cumulative error percentages of PDR, MEMS, WLAN/MEMS LC integration and WLAN/MEMS TC integration using different numbers of APs in Trajectory IV.

Figure 26:
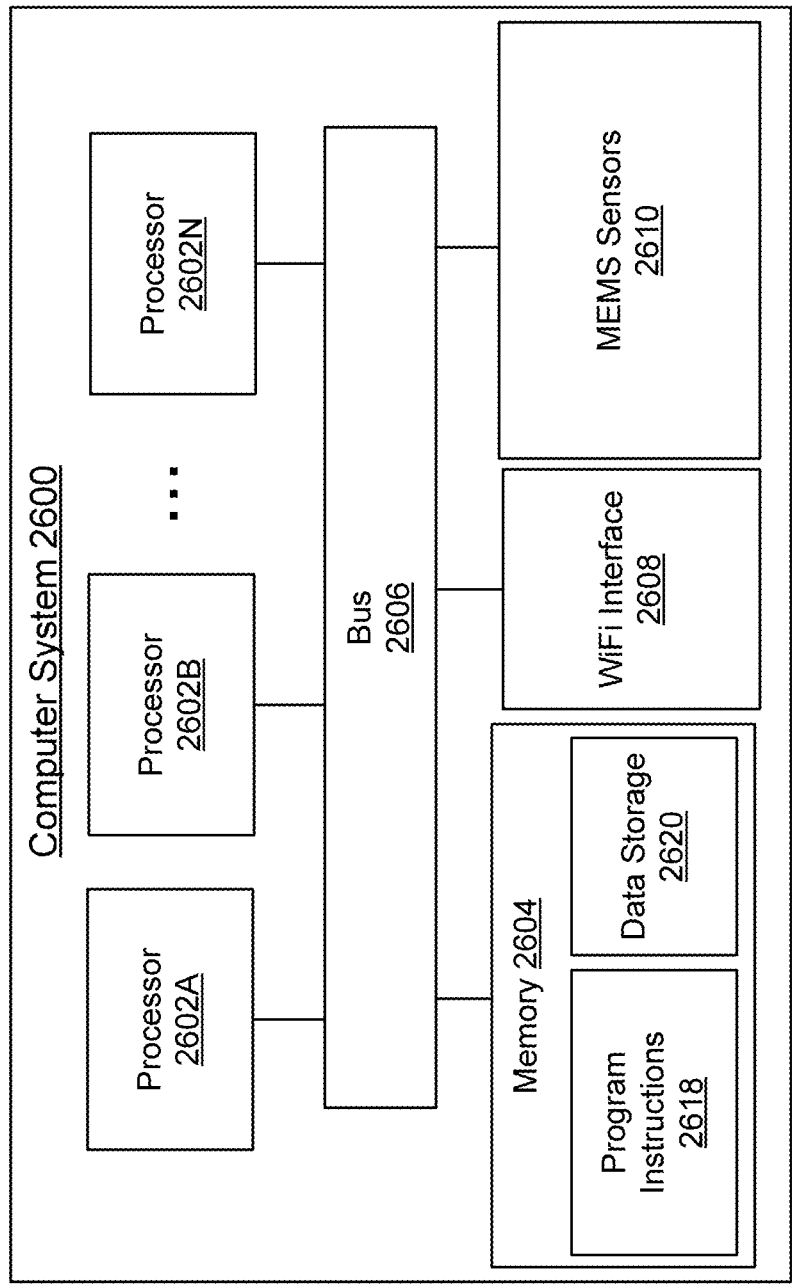
FIG. 26 is a schematic block diagram of one embodiment of a mobile device which may be specially configured to perform the steps of the methods described herein.

FIG. 26 is a schematic block diagram of one embodiment of a mobile device which may be specially configured to perform the steps of the methods described herein. In an embodiment, the mobile device comprises a computer system 2600. The computer system 2600 may include one or more processing devices 2602A-2602N. In a further embodiment, the processors 2602A-N may communicate with a memory 2604 via a bus 2606. The memory 2604 may contain program instructions 2618, that when executed cause one or more of the processors 2602A-N to carry out the steps of the methods described herein, particularly the steps of one or more of the methods described in FIGS. 1-4. The memory 2604 may also include data storage 2620 for operation of the program defined by the program instructions 2618. Additionally, the computer system 2600 may include one or more MEMS sensors 2610 as described herein. The computer system 2600 may further include a WiFi or other suitable wireless data connection 2608 which may operate or provide data or signals in accordance with the embodiments described with relation to FIGS. 1-4. One of ordinary skill will recognize alternative or additional embodiments of a computer system 2600, which may be equally or better suited for use according to the present embodiments.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention as claimed.

What is claimed is:
1. A method for enhanced Microelectromechanical (MEMS)-based navigation in a mobile device, comprising:
  receiving navigation data from one or more MEMS-based navigation sensors on board the mobile device;
  calculating, using a processing device coupled to the one or more MEMS-based navigation sensors, position, velocity, and attitude (PVA) values in response to the navigation data using an Inertial Navigation System (INS) mechanization;
  calculating, using the processing device, Pedestrian Dead Reckoning (PDR) values in response to the navigation data received from the one or more MEMS-based navigation sensors;

calculating ranges between one or more Wireless Local Area Network (WLAN) access points and the mobile device or a WLAN position solution for the mobile device; and determining, using the processing device, one or more navigation values in response to a combination of the PVA values calculated by the INS mechanization and the PDR values, in combination with at least one of the WLAN range or WLAN position solution;

wherein the one or more navigation values calculated in response to the combination of PVA values, PDR values and the WLAN range or the WLAN position solution are more accurate than a navigation value calculated in response to any one of the PVA values, PDR values, WLAN range or WLAN position solution alone.

2. The method of claim 1, wherein the method further comprises detecting whether the mobile device is moving or static and using motion constraints on the solution if the mobile is moving.

3. The method of claim 2, further comprising calculating the navigation data using a Zero velocity updates (ZUPT) algorithm and a Zero Angular Rate Updates (ZARU) algorithm if the mobile device is static.

4. The method of claim 1, further comprising:
calculating a set of WLAN positioning solutions and estimated accuracies by trilateration;
selecting a solution from the set of solutions in response to the estimated accuracies; and
estimating a position and attitude of the mobile device by a loosely-coupled integration of the navigation values and the selected WLAN positioning solution.

5. The method of claim 1, further comprising:
calculating the WLAN positioning solution according to a fingerprinting process; and
estimating the position and attitude of the mobile device by the loosely-coupled integration of the navigation values and the WLAN positioning solution.

6. The method of claim 1, further comprising:
determining MEMS sensors based ranges between the mobile device and a plurality of WLAN access points;
determining WLAN based ranges between the mobile device and WLAN access points according to an Received Signal Strength (RSS) bias value that is automatically estimated in an Extended Kalman Filter (EKF); and
estimating the position of the mobile device by tightly-coupled integration of the MEMS sensors based ranges and WLAN based ranges.

7. A system for enhanced Microelectromechanical (MEMS)-based navigation in a mobile device, comprising:
one or more MEMS-based navigation sensors on board a mobile device configured to generate navigation data;
a wireless local area network (WLAN) receiver configured to receive one or more WLAN signals; and
a processing device coupled to the one or more MEMS-based navigation sensors and the WLAN receiver, the processing device configured to:
calculate position, velocity, and attitude (PVA) values in response to the navigation data using an Inertial Navigation System (INS) mechanization;
calculate Pedestrian Dead Reckoning (PDR) values in response to the navigation data generated by the one or more MEMS-based navigation sensors;
calculate ranges between one or more WLAN access points and the mobile device or a WLAN position solution for the mobile device; and
determine one or more navigation values in response to a combination of the PVA values calculated by the INS mechanization and the PDR values in combination with at least one of the WLAN range or WLAN position solution;
wherein the one or more navigation values calculated in response to the combination of PVA values, PDR values and either the WLAN range or the WLAN position solution are more accurate than a navigation value calculated in response to any one of the PVA values, PDR values, WLAN range or WLAN position solution alone.

8. The system of claim 7, wherein the processing device is further configured to detect whether the mobile device is moving or static and using motion constraints on the solution if the mobile is moving.

9. The system of claim 8, wherein the processing device is further configured to calculate the navigation data using a Zero velocity updates (ZUPT) algorithm and a Zero Angular Rate Updates (ZARU) algorithm if the mobile device is static.

10. The system of claim 7, wherein the processing device is further configured to:
calculate a set of WLAN positioning solutions and estimated accuracies by trilateration;
select a solution from the set of solutions in response to the estimated accuracies; and
estimate a position and attitude of the mobile device by a loosely-coupled integration of the navigation values and the selected WLAN positioning solution.

11. The system of claim 7, wherein the processing device is further configured to:
calculate the WLAN positioning solution according to a fingerprinting process; and
estimate the position and attitude of the mobile device by the loosely-coupled integration of the navigation values and the WLAN positioning solution.

12. The system of claim 7, wherein the processing device is further configured to:
determine MEMS sensors based ranges between the mobile device and a plurality of WLAN access points;
determine WLAN based ranges between the mobile device and WLAN access points according to an RSS bias value that is automatically estimated in an Extended Kalman Filter (EKF); and
estimate the position of the mobile device by tightly-coupled integration of the MEMS sensors based ranges and WLAN based ranges.

13. An apparatus for enhanced Microelectromechanical (MEMS)-based navigation in a mobile device, comprising:
an Inertial Navigation System (INS) mechanization, coupled to the one or more MEMS-based navigation sensors onboard the mobile device, and configured to calculate position, velocity, and attitude (PVA) values in response to navigation data received from one or more MEMS-based navigation sensors;
a PDR processing element configured to calculate Pedestrian Dead Reckoning (PDR) values in response to the navigation data received from the one or more MEMS-based navigation sensors;
a Wireless Local Area Network (WLAN) unit configured to calculate ranges between one or more WLAN access points and the mobile device or a WLAN position solution for the mobile device; and
a navigation processing element configured to determine one or more navigation values in response to a combination of the PVA values calculated by the INS mechanization and the PDR values in combination with at least one of the WLAN range or WLAN position solution;

wherein the one or more navigation values calculated in response to the combination of PVA values, PDR values and either the WLAN range or the WLAN position solution are more accurate than a navigation value calculated in response to any one of the PVA values, PDR values, WLAN range, or WLAN position solution alone.

14. The apparatus of claim 13, further configured to detect whether the mobile device is moving or static and using motion constraints on the solution if the mobile device is moving.

15. The apparatus of claim 14, further configured to calculate the navigation data using a Zero velocity updates (ZUPT) algorithm and a Zero Angular Rate Updates (ZARU) algorithm if the mobile device is static.

16. The apparatus of claim 13, further configured to:
calculate a set of WLAN positioning solutions and estimated accuracies by trilateration;
select a solution from the set of solutions in response to the estimated accuracies; and
estimate a position and attitude of the mobile device by a loosely-coupled integration of the navigation values and the selected WLAN positioning solution.

17. The apparatus of claim 13, further configured to:
calculate the WLAN positioning solution according to a fingerprinting process; and
estimate the position and attitude of the mobile device by the loosely-coupled integration of the navigation values and the WLAN positioning solution.

18. The apparatus of claim 13, further configured to:
determine MEMS sensors based ranges between the mobile device and a plurality of WLAN access points;
determine WLAN based ranges between the mobile device and WLAN access points according to an RSS bias value that is automatically estimated in an Extended Kalman Filter (EKF); and
estimate the position of the mobile device by tightly-coupled integration of the MEMS sensors based ranges and WLAN based ranges.

* * * * *